(12) United States Patent
Takizawa et al.

(10) Patent No.: US 12,224,791 B2
(45) Date of Patent: Feb. 11, 2025

(54) INFORMATION PROCESSING APPARATUS, TRANSMISSION-SIDE APPARATUS AND METHOD

(71) Applicant: TOYOTA JIDOSHA KABUSHIKI KAISHA, Toyota (JP)

(72) Inventors: Kenichi Takizawa, Koganei (JP); Masafumi Moriyama, Koganei (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/471,707

(22) Filed: Sep. 21, 2023

(65) Prior Publication Data

US 2024/0014848 A1  Jan. 11, 2024

Related U.S. Application Data

(63) Continuation of application No. 17/933,585, filed on Sep. 20, 2022, now Pat. No. 11,799,512.

(30) Foreign Application Priority Data

Sep. 30, 2021 (JP) ................. 2021-161154

(51) Int. Cl.
*H04B 1/62* (2006.01)
*H04B 1/10* (2006.01)

(52) U.S. Cl.
CPC ............. *H04B 1/62* (2013.01); *H04B 1/1027* (2013.01); *H04B 2001/1045* (2013.01)

(58) Field of Classification Search
CPC . H04B 1/62; H04B 1/1027; H04B 2001/1045
See application file for complete search history.

(56) References Cited

U.S. PATENT DOCUMENTS

| 11,317,361 B2 | 4/2022 | Noh et al. |
| 2013/0100926 A1* | 4/2013 | Sorrentino ............ H04L 5/0094 370/330 |

(Continued)

OTHER PUBLICATIONS

Masafumi Moriyama et al., "Experimental Evaluation of a Novel Up-Link NOMA System for IoT Communication Equipping Repetition Transmission and Receive Diversity", IEICE Trans. Commun., vol. E102-B, No. 8, Aug. 2019, pp. 1467-1476.

(Continued)

*Primary Examiner* — Janice N Tieu
(74) *Attorney, Agent, or Firm* — Finnegan, Henderson, Farabow, Garrett and Dunner, LLP

(57) ABSTRACT

When signals are simultaneously received from K transmission-side apparatuses by a receiving antenna, and repetition is performed by the K transmission-side apparatuses, an information processing apparatus is configured to: in order to obtain a transmitted reference signal x(k,n) transmitted from a transmission-side apparatus k (k=1, . . . , K) by the n-th reference signal transmission in the repetition, acquire a phase rotation amount φ(g,n) given to a transmitted reference signal x(k) and assigned to a group g to which the transmission-side apparatus k belongs and transmit the phase rotation amount φ(g,n) to the transmission-side apparatus k. The phase rotation amount φ(g,n) is acquired so that received reference signals from transmission-side apparatuses not belonging to the group g are cancelled when a phase rotation amount opposite to the phase rotation amount φ(g,n) is given to a received reference signal r(n), and the first to N-th received reference signals in the repetition are added.

10 Claims, 17 Drawing Sheets

(56) References Cited

U.S. PATENT DOCUMENTS

| | | |
|---|---|---|
| 2015/0078496 A1* | 3/2015 | Farrugia ............. H03M 1/0836 |
| | | 375/346 |
| 2017/0339709 A1 | 11/2017 | Zhang et al. |
| 2019/0013881 A1 | 1/2019 | Olesen et al. |
| 2019/0215204 A1 | 7/2019 | Shim et al. |
| 2019/0312691 A1 | 10/2019 | Park et al. |
| 2019/0313398 A1* | 10/2019 | Matsumura ............. H04L 27/26 |
| 2020/0021410 A1 | 1/2020 | Choi et al. |
| 2022/0413132 A1 | 12/2022 | Hasegawa |

OTHER PUBLICATIONS

3GPP TR 38.830, Study on NR Coverage Enhancements (Release 17), V17.0.0, Dec. 2020.

* cited by examiner

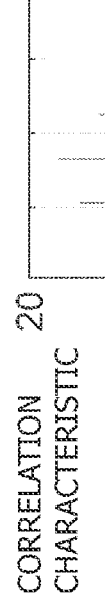
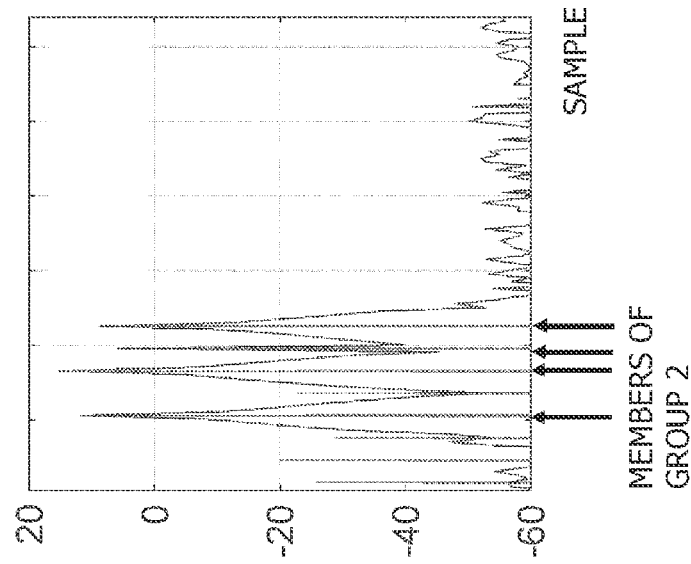
FIG. 16

INFORMATION PROCESSING APPARATUS, TRANSMISSION-SIDE APPARATUS AND METHOD

CROSS REFERENCE TO RELATED APPLICATION

This application is a continuation of U.S. patent application Ser. No. 17/933,585, filed Sep. 20, 2022, which claims the benefit of Japanese Patent Application No. 2021-161154, filed on Sep. 30, 2021, both of which are hereby incorporated by reference herein in their entirety.

BACKGROUND

Technical Field

The present disclosure relates to radio communication.

Description of the Related Art

Increase in the number of mobile IoT terminals for which low latency is a priority, for example, a connected car and a drone, is expected. However, frequency resources to accommodate mobile IoT terminals are tight. Therefore, low latency and efficient use of frequency is desired in radio communication.

Configured grant (CG) is used to achieve low-latency radio communication. In a conventional communication procedure, when transmitting data to a base station, a terminal receives grant of transmission and specification of radio resources that can be used for the data transmission from the base station first, and transmits the data by the specified radio resources. In comparison, in CG, for example, a base station notifies a terminal of transmission parameters specifying radio resources and the like that can be used for data transmission and grant of communication in advance. Thereby, when transmitting data, the terminal can immediately transmit the data to the base station using the specified radio resources, omitting negotiation with the base station.

Non-orthogonal multiple access (NOMA) is used to achieve efficient use of frequency. NOMA is a method in which the same frequency band and the same time domain are shared by a plurality of terminals.

CITATION LIST

Non-Patent Document

[Non-Patent Document 1]
Masafumi MORIYAMA, Kenichi TAKIZAWA, Masayuki OODO, Hayato TEZUKA, Fumihide KOJIMA, "Experimental Evaluation of a Novel Up-link NOMA System for IoT communication Equipping Repetition Transmission and Receive Diversity," IEICE TRANSACTIONS on Communications, Aug. 1, 2019, Vol. E102-B, No. 8, pp. 1467-1476

However, since signals transmitted from terminals are superimposed and received at a base station in the case of using NOMA, there is a strong possibility that a signal received at the base station is influenced by interference among signals from the terminals due to the superimposition. As a result, there is a possibility that it becomes difficult for the base station to restore the original signal transmitted from each terminal, and the communication quality deteriorates.

A subject of one of aspects of the present disclosure is to provide an information processing apparatus, a transmission-side apparatus, and a method capable of improving radio communication quality in a case where the same frequency band and the same time domain are shared by a plurality of terminals.

SUMMARY

An aspect of the present disclosure is an information processing apparatus including a controller configured to, when signals are simultaneously received from K transmission-side apparatuses (K: a positive integer) by a receiving antenna, and repetition of repeatedly and successively transmitting the same signal N times (N: a positive integer) is performed by the K transmission-side apparatuses:
  divide the K transmission-side apparatuses into G groups (G: a positive integer; $1 < G \leq K$);
  in order to obtain a transmitted reference signal $x(k,n)$ transmitted from a transmission-side apparatus k ($k=1, \ldots, K$) included among the K transmission-side apparatuses by the n-th ($n=1, \ldots, N$) reference signal transmission in the repetition, acquire a phase rotation amount $\varphi(g,n)$ that is a phase rotation amount given to a transmitted reference signal $x(k)$ and that is assigned to a group g ($g=1, \ldots, G$) to which the transmission-side apparatus k belongs so that received reference signals from transmission-side apparatuses not belonging to the group g are cancelled when giving a phase rotation amount opposite to the phase rotation amount $\varphi(g,n)$ to a received reference signal $r(n)$ that is received by the receiving antenna by the n-th reference signal transmission in the repetition and that includes a transmitted reference signal from each of the K transmission-side apparatuses and adding the first to N-th received reference signals in the repetition, and
  transmit a phase sequence $\Phi g = \{\varphi(g,1), \ldots, \varphi(g,N)\}$ that includes the phase rotation amount $\varphi(g,n)$ for the group g for each of the first to N-th transmissions, to the transmission-side apparatus k.

Another aspect of the present disclosure is a transmission-side apparatus including:
  at least one transmitting antenna; and
  a controller configured to, when the transmission-side apparatus transmits a signal simultaneously with other K−1 transmission-side apparatuses (K: a positive integer), and each of the transmission-side apparatus and the other K−1 transmission-side apparatuses performs repetition of repeatedly and successively transmitting the same signal N times (N: a positive integer):
  receive a phase sequence $\Phi g = \{\varphi(g,1), \ldots, \varphi(g,N)\}$ that includes a phase rotation amount $\varphi(g,n)$ given to a transmitted reference signal $x(s)$ (s indicates the apparatus itself) from a reception-side apparatus, the phase sequence $\Phi g = \{\varphi(g,1), \ldots, \varphi(g,N)\}$ being assigned to a group g (g: an integer from 1 to G) to which the transmission-side apparatus itself belongs, among G groups into which K transmission-side apparatuses including the other K−1 transmission-side apparatuses and the apparatus itself are divided, in the n-th ($n=1, \ldots, N$) reference signal transmission in the repetition;
  acquire a transmitted reference signal $x(s,n)$ by giving a phase rotation amount $\varphi(g,n)$ to the transmitted reference signal $x(s)$ in the n-th reference signal transmission in the repetition; and
  transmit the transmitted reference signal $x(s,n)$ from the at least one transmitting antenna.

Another aspect of the present disclosure is a method executed by a computer including:

when signals are simultaneously received from K transmission-side apparatuses (K: a positive integer) by a receiving antenna, and repetition of repeatedly and successively transmitting the same signal N times (N: a positive integer) is performed by the K transmission-side apparatuses, dividing the K transmission-side apparatuses into G groups (G: a positive integer; $1<G\le K$), acquiring, in order to obtain a transmitted reference signal $x(k,n)$ transmitted from a transmission-side apparatus k ($k=1, \ldots, K$) included among the K transmission-side apparatuses by the n-th ($n=1, \ldots, N$) reference signal transmission in the repetition, a phase rotation amount $\varphi(g,n)$ that is a phase rotation amount given to a transmitted reference signal $x(k)$ and that is assigned to a group g ($g=1, \ldots, G$) to which the transmission-side apparatus k belongs so that received reference signals from transmission-side apparatuses not belonging to the group g are cancelled when giving a phase rotation amount opposite to the phase rotation amount ($\varphi(g,n)$) to a received reference signal $r(n)$ that is received by the receiving antenna by the n-th reference signal transmission in the repetition and that includes a transmitted reference signal from each of the K transmission-side apparatuses and adding the first to N-th received reference signals in the repetition, and transmitting a phase sequence $\Phi g=\{\varphi(g,1), \ldots, \varphi(g,N)\}$ that includes the phase rotation amount $\varphi(g,n)$ for the group g for each of the first to N-th transmissions, to the transmission-side apparatus k.

According to one of aspects of the present disclosure, it is possible to improve radio communication quality in a case where the same frequency band and the same time domain are shared by a plurality of terminals.

BRIEF DESCRIPTION OF DRAWINGS

FIG. 16 illustrates examples of a graph illustrating correlation characteristics of a received reference signal at the base station when, in repetition of reference signals, phase rotation is performed for transmitted reference signals and received reference signals like the first embodiment.

DESCRIPTION OF THE EMBODIMENTS

Figure 1:
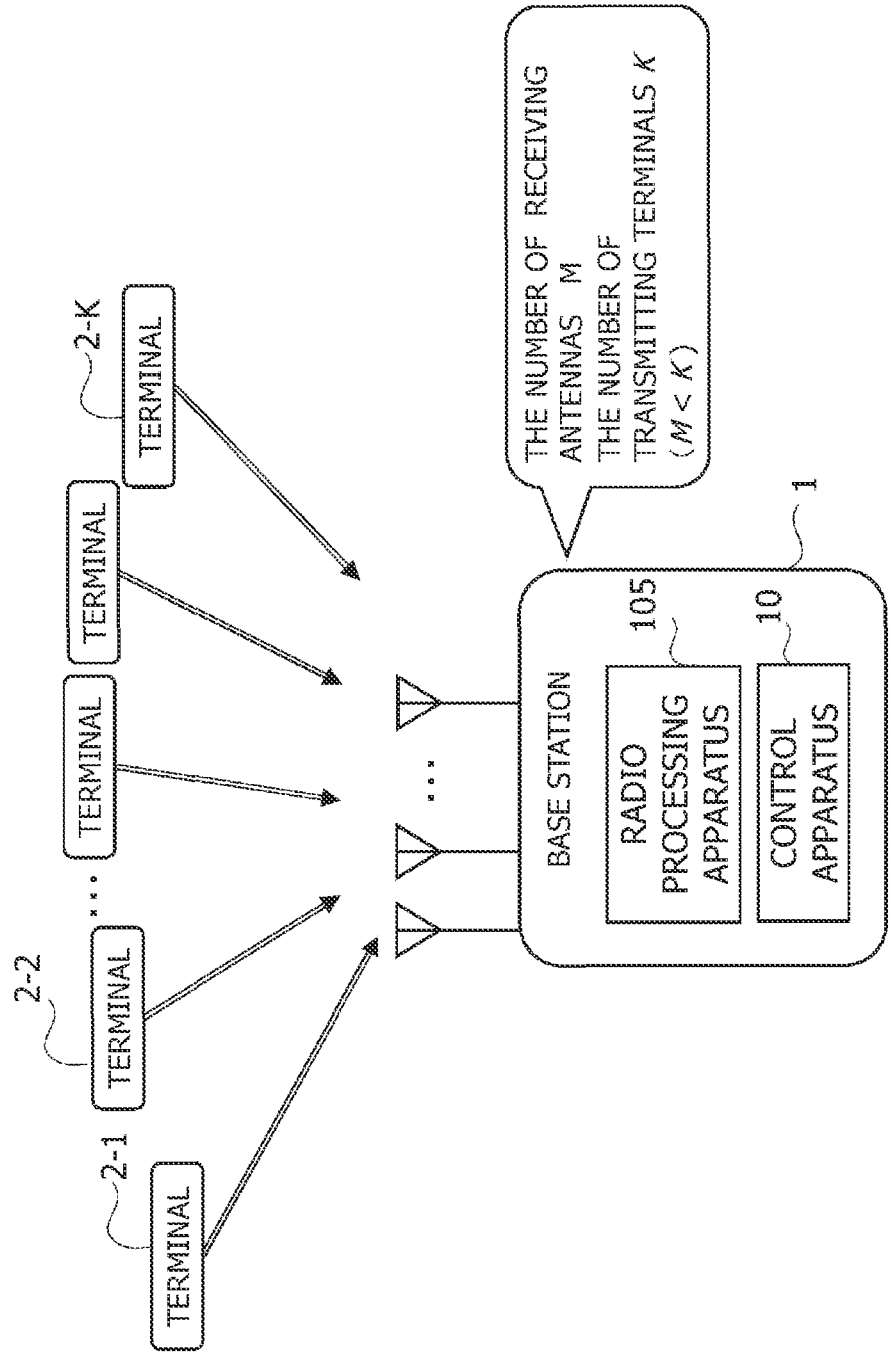
FIG. 1 is a diagram exemplifying a configuration of a radio communication system according to a first embodiment.

A data signal transmitted from a terminal is influenced by an environment before reaching a base station, and reaches the base station, with an interference signal being added. Therefore, at the base station, the influence of a communication channel is estimated, and the original data signal is restored from a received data signal using a result of the estimation of the communication channel. That is, by accurately estimating the communication channel, it is possible to restore the data signal more accurately and improve the quality of radio communication.

The estimation of a communication channel is performed using a reference signal received from a terminal. Therefore, in order to estimate the communication channel accurately, it is desired to sufficiently obtain a signal-noise ratio (SNR) of the reference signal.

Further, by a terminal moving, and, for example, a distance from a base station being long, a situation may occur that the SNR of a received signal from the terminal is not sufficiently obtained. In such a case, by causing the terminal to repeatedly transmit the same signal a predetermined number of times and adding signals received from the terminal, corresponding to the predetermined number of times, a sufficient SNR for the received signal from the terminal can be obtained. To repeatedly transmit the same signal a predetermined number of times is referred to as repetition. Repetition may be performed for both of a reference signal and a data signal.

However, when a plurality of terminals share the same frequency band and the same time domain, interference among signals form the terminals remains on a received reference signal even if repetition is performed to sufficiently obtain the SNR of the received reference signal. If interference among signals from terminals remains on a received reference signal, and the influence is significant, the accuracy of communication channel estimation is reduced, and the accuracy of restoration of a data signal may be reduced.

In one of aspects of the present disclosure, at a base station, by adding received reference signals corresponding to a predetermined number of times in repetition from a plurality of terminals to cause received reference signals from a part of the terminals to be cancelled, received reference signals from a remaining part of the terminals are taken out. Interference by the received reference signals from the part of terminals does not remain on the acquired received reference signals, and it becomes possible to accurately estimate communication channels from the remaining part of the terminals to the base station.

Specifically, the one of the aspects of the present disclosure is an information processing apparatus provided with a controller. The information processing apparatus may be an apparatus provided for a reception-side apparatus or may be an apparatus independent from the reception-side apparatus. The reception-side apparatus is, for example, a base station. The reception-side apparatus, however, is not limited thereto but may be a terminal at the time of receiving a data signal. The controller may be, for example, a processor such as a CPU (central processing unit). The transmission-side apparatus is, for example, user equipment (UE). The transmission-side apparatus, however, is not limited thereto but may be a base station in the case of transmitting a data signal.

In the one of the aspects of the present disclosure, such a case is assumed that signals are simultaneously received from K (K: a positive integer) transmission-side apparatuses by a receiving antenna provided for the reception-side apparatus, and repetition of repeatedly transmitting the same signal N times (N: a positive integer) is performed by each of the K transmission-side apparatuses. In such a case, the controller may divide the K transmission-side apparatuses into G groups (G: a positive integer; 1<G≤K). Transmission-side apparatuses belonging to the same group may use the same phase rotation amount $\varphi(g,n)$. The phase rotation amount $\varphi(g,n)$ may be a phase rotation amount that a transmission-side apparatus k belonging to a group g (g: an integer from 1 to G) use in the n-th (n: an integer from 1 to N) reference signal transmission in the repetition.

The transmission-side apparatus k (k: an integer from 1 to K) may generate a transmitted reference signal x(k). The transmitted reference signal x(k) may be the same signal in the first to N-th transmissions in the repetition. At the time of the n-th reference signal transmission in the repetition, the transmission-side apparatus k may transmit a transmitted reference signal x(k,n) obtained by giving the phase rotation amount $\varphi(g,n)$ (g: the group to which the transmission-side apparatus k belongs) to the transmitted reference signal x(k).

In the reception-side apparatus, a received reference signal r(n) may be received by the receiving antenna by the n-th reference signal transmission in the repetition. The received reference signal r(n) may include a received reference signal corresponding to a transmitted reference signal from each of the K transmission-side apparatuses. A received reference signal r(k,n) may correspond to a signal obtained by influence on a communication channel being added to the transmitted reference signal x(k,n) transmitted from the transmission-side apparatus k, and include the transmitted reference signal x(k,n) and noise.

The controller may acquire the phase rotation amount $\varphi(g,n)$ that the transmission-side apparatus k uses for the n-th transmission of the reference signal x(k) in the repetition so that received reference signals from transmission-side apparatuses not belonging to the group g are cancelled when giving a phase rotation amount opposite to the phase rotation amount $\varphi(g,n)$ of the group g to the received reference signal r(n) by the n-th transmission in the repetition and adding the first to N-th received reference signals. More specifically, the controller may acquire the phase rotation amount $\varphi(g,n)$ such that a phase sequence $\Phi g1$ and a phase sequence $\Phi g2$ are orthogonal to each other in all of combinations of two groups g1 and g2 (g1∈{1, ..., G}; g2∈{1, ..., G}; g1≠g2) among the G groups. The controller may transmit a phase sequence $\Phi g=\{\varphi(g,1), ..., \varphi(g,N)\}$ that includes the phase rotation amount $\varphi(g,n)$ for each of the first to N-th transmissions of the group g, to the transmission-side apparatus k.

When each transmission-side apparatus k performs repetition of a reference signal using a phase rotation amount $\varphi(k,n)$, the reception-side apparatus may acquire a received reference signal r(g) for each group g, by giving a phase rotation amount opposite to the phase rotation amount ($\varphi(g,n)$) of the group g to a received reference signal r(n) by the n-th transmission in the repetition and adding the first to N-th received reference signals. The received reference signal r(n) by the n-th transmission in the repetition includes received reference signals r(k,n) from transmission-side apparatuses k belonging to the group g and received reference signals r(p,n) from transmission-side apparatuses p not belonging to the group g. However, by multiplying the received reference signals r(p,n) by the n-th transmission in the repetition by the phase rotation amount $\varphi(g,n)$ of the group g to which the transmission-side apparatuses p do not belong and adding the first to N-th received reference signals of the repetition, the received reference signals r(p,n) are cancelled. As a result, the received reference signal r(g) includes the received reference signals received from the one or more transmission-side apparatuses belonging to the group g but does not include the received reference signals received from the transmission-side apparatuses not belonging to the group g.

That is, the received reference signals r(k) from the transmission-side apparatuses k belonging to the group g, which is included in the received reference signal r(g), are not influenced by the received reference signals from the transmission-side apparatuses not belonging to the group g. By performing the same for each group to obtain a received reference signals r(g1), ..., r(G), it is possible to reduce influence of interference among signals from the terminals more to obtain the received reference signals r(k) from the transmission-side apparatuses k. Therefore, if communication channel estimation is performed based on the received reference signals r(g1), ..., r(G), a more accurate estimation result can be obtained. By obtaining the more accurate estimation result, it is possible to restore a data signal corresponding to a reference signal more accurately, and, consequently, it is possible to improve the quality of radio communication.

In the one of the aspects of the present disclosure, the controller may generate the G groups based on ascending order of propagation losses, descending order of received signal powers or ascending order of signal-to-noise ratios, from the K transmission-side apparatuses. Thereby, it is possible to cause transmission-side apparatuses with similar magnitudes of received signal power to be group members. By determining r(g) for the group g with smaller received signal power among the G groups, it is possible to cancel received reference signals r(p) from transmission-side apparatuses p of a group with larger received signal power. Generally, received reference signals r(s) from transmission-side apparatuses s belonging to the group g with the smaller received signal power are significantly influenced by interference of the received reference signals r(p) from the transmission-side apparatuses p of the group with the larger received signal power. According to the one of the aspects of the present disclosure, it is possible to reduce the influence of the interference by the received reference signals r(p) from the transmission-side apparatuses p of the groups with the larger received signal power on the received reference signals r(s) from the transmission-side apparatuses s belonging to the group g with the smaller received signal power, and it is possible to accurately acquire correlation characteristics of the received reference signals r(s) from the transmission-side apparatuses s belonging to the group g with the smaller received signal power.

When the reception-side apparatus is provided with M receiving antennas (M: a positive integer), communication channel estimation may be executed by adding reference signals corresponding to the N transmissions that are transmitted by repetition to obtain received reference signals r(g1), . . . , r(G) similarly to the above for each receiving antenna.

One of other aspects of the present disclosure is a transmission-side apparatus. The transmission-side apparatus is provided with at least one transmitting antenna and a controller. The controller of the transmission-side apparatus may be, for example, a processor such as a CPU. When the transmission apparatus transmits a signal simultaneously with other K−1 transmission-side apparatuses, and each transmission apparatus performs repetition of repeatedly and successively transmitting the same signal N times (N: a positive integer), the controller of the transmission-side apparatus may receive a phase sequence $\Phi g=\{\varphi(g,1), \ldots, \varphi(g,N)\}$ from a reception-side apparatus. The phase sequence $\Phi g$ includes the phase rotation amount $\varphi(g,n)$ given to a transmitted reference signal x(s) (s indicates the apparatus itself), the phase rotation amount $\varphi(g,n)$ being assigned to the group g to which each transmission-side apparatus itself belongs, among G groups into which K transmission-side apparatuses including the other K−1 transmission-side apparatuses and the apparatus itself are divided, in the n-th reference signal transmission in the repetition. The controller of the transmission-side apparatus may execute acquiring a transmitted reference signal x(s,n) by giving a phase rotation amount $\varphi(g,n)$ to the transmitted reference signal x(s) in the n-th reference signal transmission in the repetition; and transmitting the transmitted reference signal x(s,n) from the at least one transmitting antenna. By the above transmission-side apparatus transmitting the n-th transmitted reference signal x(s,n) in the repetition as above, the reception-side apparatus can accurately estimate a communication channel.

One of the other aspects of the present disclosure can be identified as a method executed by a computer. The computer may be, for example, a computer corresponding to the information processing apparatus described above. The method includes: when signals are simultaneously received from K transmission-side apparatuses (K: a positive integer) by a receiving antenna, and repetition of repeatedly and successively transmitting the same signal N times (N: a positive integer) is performed by the K transmission-side apparatuses, a computer dividing the K transmission-side apparatuses into G groups (G: a positive integer; 1<G≤K); and, in order to obtain a transmitted reference signal x(k,n) transmitted from a transmission-side apparatus k (k=1, . . . , K) included among the K transmission-side apparatuses by the n-th (n=1, . . . , N) reference signal transmission in the repetition, the computer acquiring a phase rotation amount $\varphi(g,n)$ that is a phase rotation amount given to a transmitted reference signal x(k) and that is assigned to a group g (g=1, . . . , G) to which the transmission-side apparatus k belongs so that received reference signals from transmission-side apparatuses not belonging to the group g are cancelled when giving a phase rotation amount opposite to the phase rotation amount $\varphi(g,n)$ to a received reference signal r(n) that is received by the receiving antenna by the n-th reference signal transmission in the repetition and that includes a received reference signal corresponding to a transmitted reference signal from each of the K transmission-side apparatuses and adding the first to N-th received reference signals in the repetition; and the computer transmitting a phase sequence $\Phi g=\{\varphi(g,1), \ldots, \varphi(g,N)\}$ that includes the phase rotation amount $\varphi(g,n)$ for the group g for each of the first to N-th transmissions, to the transmission-side apparatus k.

In the following, embodiments of the present disclosure will be described with reference to the drawings. The configuration of the embodiments described below are examples, and the present disclosure is not limited to the configuration of the embodiments.

First Embodiment

FIG. 1 is a diagram exemplifying a configuration of a radio communication system 100 according to a first embodiment. The radio communication system 100 includes a base station 1 and a plurality of terminals 2-1, 2-2, . . . , 2-K that wirelessly communicate with the base station 1. The terminal 2-1 and the like will be generically referred to as the terminals 2. The terminals 2 can be also referred to as radio communication terminals, user equipment (UE), transmitting stations, terminal stations or transmission-side apparatuses. The base station 1 is provided with M receiving antennas, a radio processing apparatus 105 and a control apparatus 10.

In the radio communication system 100, NOMA is used, and each receiving antenna receives signals from the K terminals 2 in the same time domain in the same frequency band. Therefore, the signals from the K terminals 2 are superimposedly received at the base station 1, and inter-terminal interference is removed. In the first embodiment, the base station 1 uses, for example, successive interference cancellation (SIC) as a technology for removing the inter-terminal interference. Further, in the radio communication system 100, if a sufficient SNR is not obtained at the base station by transmitting a signal once, each terminal 2 performs repetition of repeatedly transmitting the same signal a predetermined number of times.

In the first embodiment, the base station 1 divides the K terminals 2 into G groups. In order that reference signals received from terminals 2 other than terminals 2 belonging to one group cancel one another by adding received signals by each transmission in repetition at the base station 1, the base station 1 acquires a phase rotation amount $\varphi$ for each group and notifies terminals 2 belonging to the group of the phase rotation amount $\varphi$. In the first embodiment, in the case of performing repetition of a reference signal, each terminal 2 gives a phase rotation amount $\varphi$ given to the group g to which the terminal 2 belongs, to a transmitted reference signal (a transmitted RS) to transmit the transmitted RS. When adding received reference signals (received RS's) corresponding to N times transmitted by the repetition, the base station 1 gives, to a received RS of each time, a phase rotation amount $-\varphi$ that is opposite to the phase rotation amount $\varphi$ given to transmitted RS's of the group g. By doing so, the base station 1 can cancel received RS's of terminals 2 other than the terminals 2 belonging to the group g among the received RS's corresponding to N times to acquire the received RS from the terminals 2 belonging to the group g. The received RS from the terminals 2 belonging to the group g obtained in this way can be acquired in a state of not being interfered by the received RS's from the terminals 2 belonging to the other groups.

When restoring a data signal transmitted from each terminal 2 from data signals received from the K terminals 2 and when performing SIC, the base station 1 uses a result of estimation of a communication channel between each terminal 2 and the base station 1. The communication channel estimation is performed based on a received RS. Therefore, by acquiring a received RS from each terminal 2 with little inter-terminal interference, it is possible to improve the accuracy of communication channel estimation and, consequently, improve the quality of radio communication.

Figure 2:
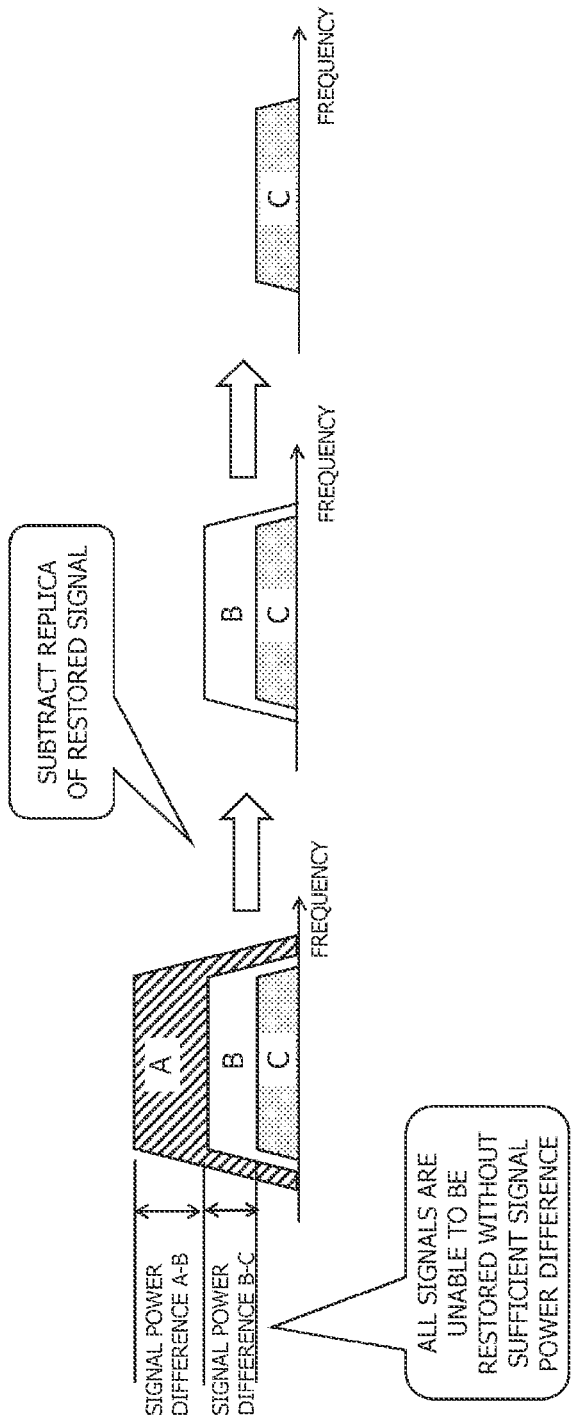
FIG. 2 is a diagram illustrating description of SIC.

FIG. 2 is a diagram illustrating description of SIC. When NOMA is used on the uplink from the terminals 2 to the base station 1, signals from other terminals become interference signals to a signal from one terminal. The SIC removes interference by creating a replica signal obtained by reproducing a received signal from a terminal 2 with high received signal power and subtracting the replica signal from a received superimposed signal. By repeating this process, it is possible to separate a received data signal from each terminal 2, from the superimposed signal and restore the received data signal. At the time of separating the received data signal from each terminal 2 and at the time of creating the replica signal, a communication channel estimation value is used.

In FIG. 2, received signals from terminals A, B and C are included in a superimposed signal. It is assumed that received signal power is larger in order of the terminal A>the terminal B>the terminal C. In SIC, first, a received signal from the terminal A with the largest received signal power is separated and restored, and a replica signal of the terminal A is subtracted from the superimposed signal. The remaining superimposed signal includes received signals from the terminals B and C. For the received signals from the terminals B and C, the received signal from the terminal A is an interference signal, and influence of the interference is large because the signal power is large. Since the interference signal that is very influential on the received signals from the terminals B and C disappears by the replica signal of the terminal A being subtracting from the superimposed signal, it is possible to, when the received signal from the terminal B is separated from the remaining superimposed signal and restored, obtain a signal with good accuracy that is less influenced by interference. Here, "with good accuracy" stated above means that an error between the original signal transmitted from the terminal B and a signal restored by SIC is small. In the example illustrated in FIG. 2, when a replica signal of the terminal B is subtracted from the remaining superimposed signal, the received signal from the terminal C is obtained.

However, if there is not a sufficient difference among terminals 2 in received signal power in the case of performing SIC, there is a strong possibility that SNRs of the terminals 2 will not be sufficiently obtained, and there may be a case where it is not possible to separate and restore a received signal from each terminal 2. The difference in received signal power is, for example, a power difference A-B between the received signal from the terminal A and the received signal from the terminal B, or a power difference B-C between the received signal from the terminal B and the received signal from the terminal C in FIG. 2.

Figure 3:
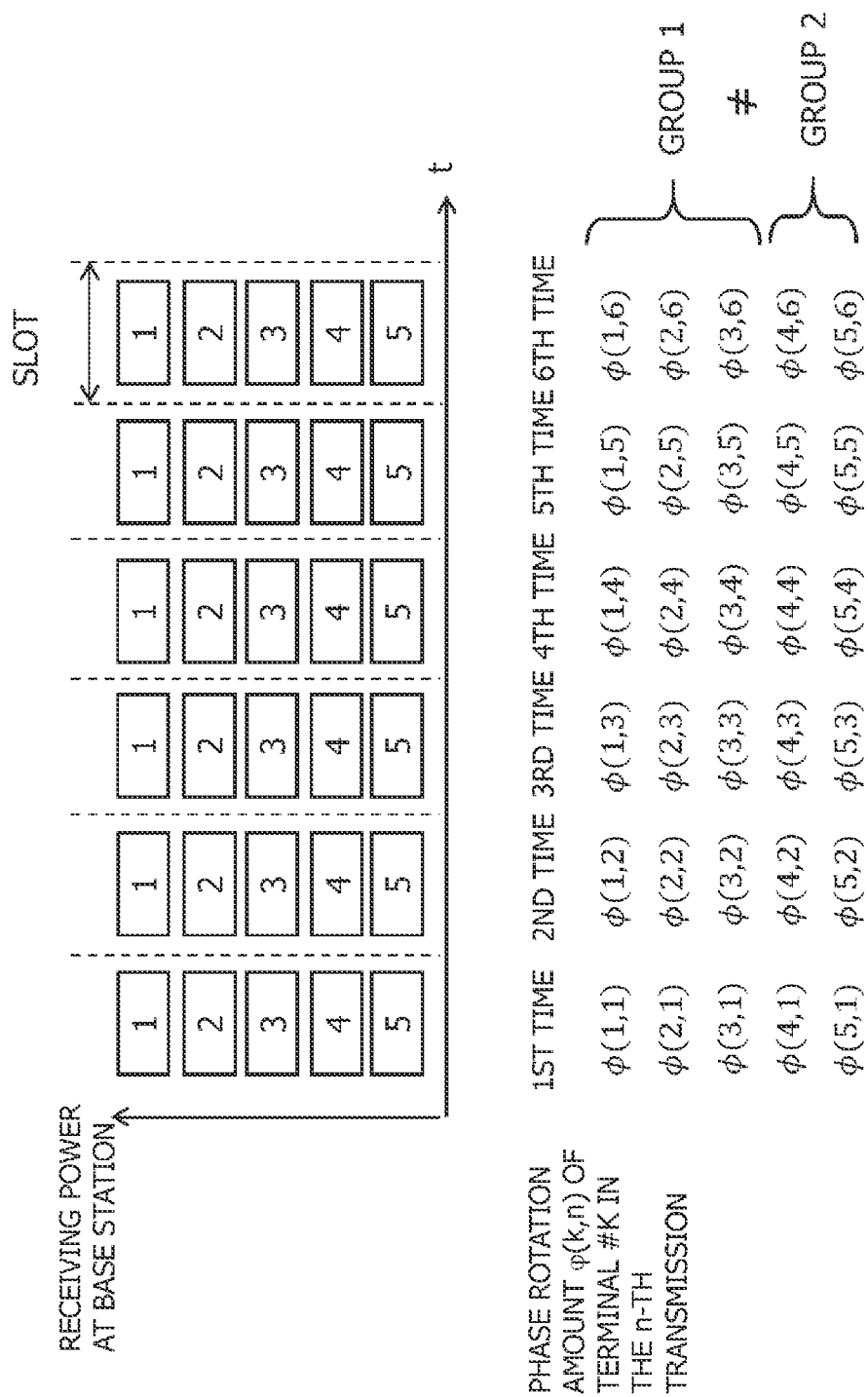
FIG. 3 is a diagram illustrating repetition.

FIG. 3 is a diagram illustrating repetition. In FIG. 3, signals received by repetition when five terminals 2 share the same frequency band and time domain are illustrated. In NOMA, signals of terminals 2 with different power values are stored in one time domain called slot. In FIG. 3, one block indicates a signal of one terminal 2, and a numeral in each block indicates a terminal. A transmission power value of a signal of each terminal 2 in repetition is, for example, determined by the control apparatus 10 of the base station 1 and notified to each terminal 2, prior to the repetition.

In repetition, each terminal 2 repeatedly and successively transmits the same signal N times. Though signals transmitted from each terminal 2 from the first to the N-th times are the same signal, signals are different among the terminals 2. In repetition, the number of times N that the same signal is transmitted is set, for example, such that the repetition ends within a time length during which the environment of a communication channel is assumed not to change. The environment of a communication channel changes, for example, due to movement of a terminal 2, movement of an obstacle and influence of weather and the like.

In FIG. 3, a phase rotation amount $\varphi(k,n)$ given to a transmitted reference signal in the n-th transmission by a terminal #k is also illustrated. Here, k is a variable indicating a terminal, and takes a value from 1 to K. Here, n is a variable indicating the number of times in repetition, and takes a value from 1 to N.

In the first embodiment, phase rotation amounts $\varphi(k,n)$ are determined to be different among groups and different among transmissions. Specifically, in FIG. 3, phase rotation amounts $\{\varphi(g1,1), \varphi(g1,2), \ldots, \varphi(g1,6)\}$ corresponding to N times that are given to terminals #1 to #3 belonging to a group 1 and phase rotation amounts $\{\varphi(g2,1), \varphi(g2,2), \ldots, \varphi(g2,6)\}$ corresponding to N times that are given to terminals #4 and #5 belonging to a group 2 are different. For example, phase rotation amounts $\{\varphi(1,1), \varphi(2,1), \ldots, \varphi(5,1)\}$ of the terminals #k used for the first transmission are different from phase rotation amounts $\{\varphi(1,2), \varphi(2,2), \ldots, \varphi(5,2)\}$ of the terminals #k used for the second transmission.

That the phase rotation amounts $\varphi(k,n)$ corresponding to N times are different among the groups means that all the groups don't take the same values for the phase rotation amounts $\varphi(k,n)$ corresponding to N times, but a part of groups may take the same values. For example, when three groups exist, it is sufficient that phase rotation amounts $\varphi(k,n)$ corresponding to N times given to the three groups are not the same, and phase rotation amounts $\varphi(k,n)$ corresponding to N times for two groups among the three groups may be the same.

That the phase rotation amount $\varphi(k,n)$ used by each terminal k differs among transmissions means that the phase rotation amount $\varphi(k,n)$ used by each terminal k does not take the same value for all the transmissions, but the phase rotation amount $\varphi(k,n)$ used by the terminal k may take the same value in a part of transmissions. For example, in the example illustrated in FIG. 3, it is sufficient that all combinations of values of the phase rotation amounts $\varphi$ of the terminals #1 to #5 for the first to sixth transmissions are not the same, and, for example, a combination of the phase rotation amounts $\varphi(k,1)$ of the terminals #1 to #5 in the first transmission and a combination of the phase rotation amounts $\varphi(k,3)$ of the terminals #1 to #5 in the third transmission may be the same. Details of a method for determining the phase rotation amounts $\varphi(k,n)$ will be described later.

Figure 4:
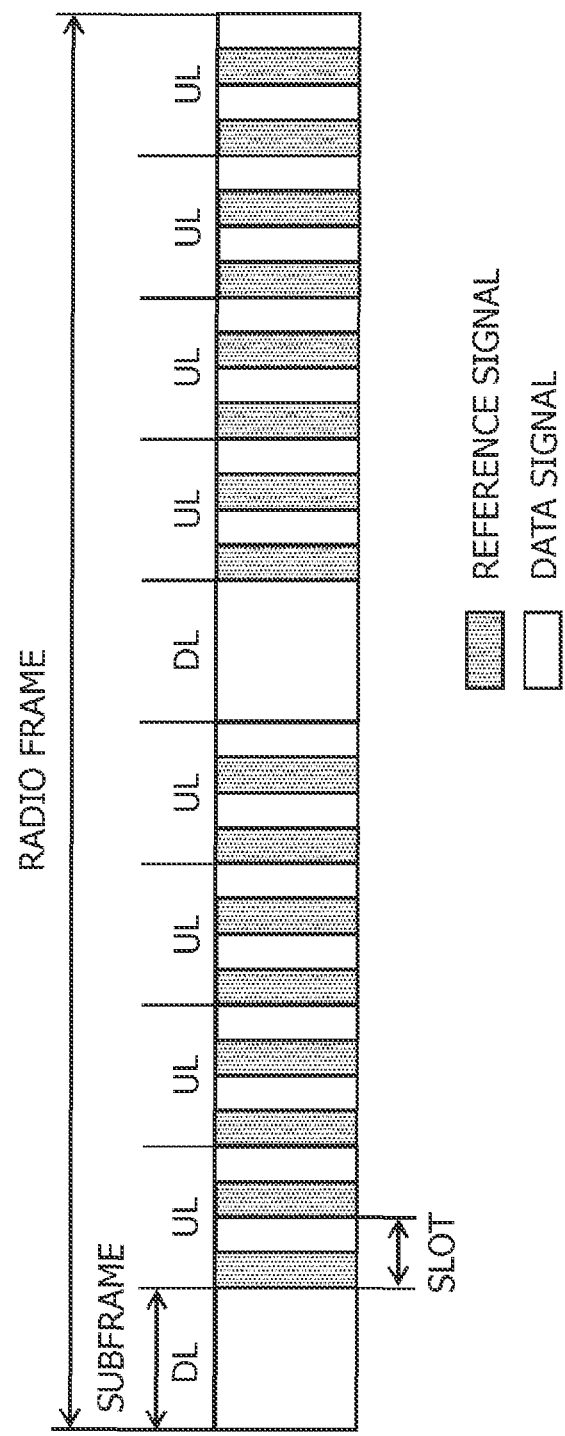
FIG. 4 is a diagram illustrating a radio frame for performing signal transmission.

FIG. 4 is a diagram illustrating a radio frame for performing signal transmission. A radio frame is one unit for signal transmission in the time domain. Radio frames are defined in units of 10 ms. One radio frame further includes a plurality of subframes. The subframes are defined in units of 1 ms. Each subframe further includes a plurality of slots. A slot is a data scheduling unit. One slot corresponds to, for example, 500 µS.

In the case of performing radio communication, either an uplink (UL) or a downlink (DL) is assigned for each subframe. A direction from each terminal 2 to the base station 1 is the uplink. A direction from the base station 1 to each terminal 2 is the downlink. When a terminal 2 transmits data, a subframe assigned to the uplink is used.

When a terminal 2 transmits data, a pair of an RS and a DS is transmitted. Each of the RS and the DS is arranged in one slot. However, slots storing the RS and the DS do not have to be adjoining each other. Though RS's and DS's are alternately arranged in the example illustrated in FIG. 4, arrangement of RS's and DS's is not limited to that illustrated in FIG. 4. Since an RS and a DS are different in their roles and in included data, processing for an RS and processing for a DS are different at the terminals 2 and the base station 1.

<Apparatus Configuration>

Figure 5:
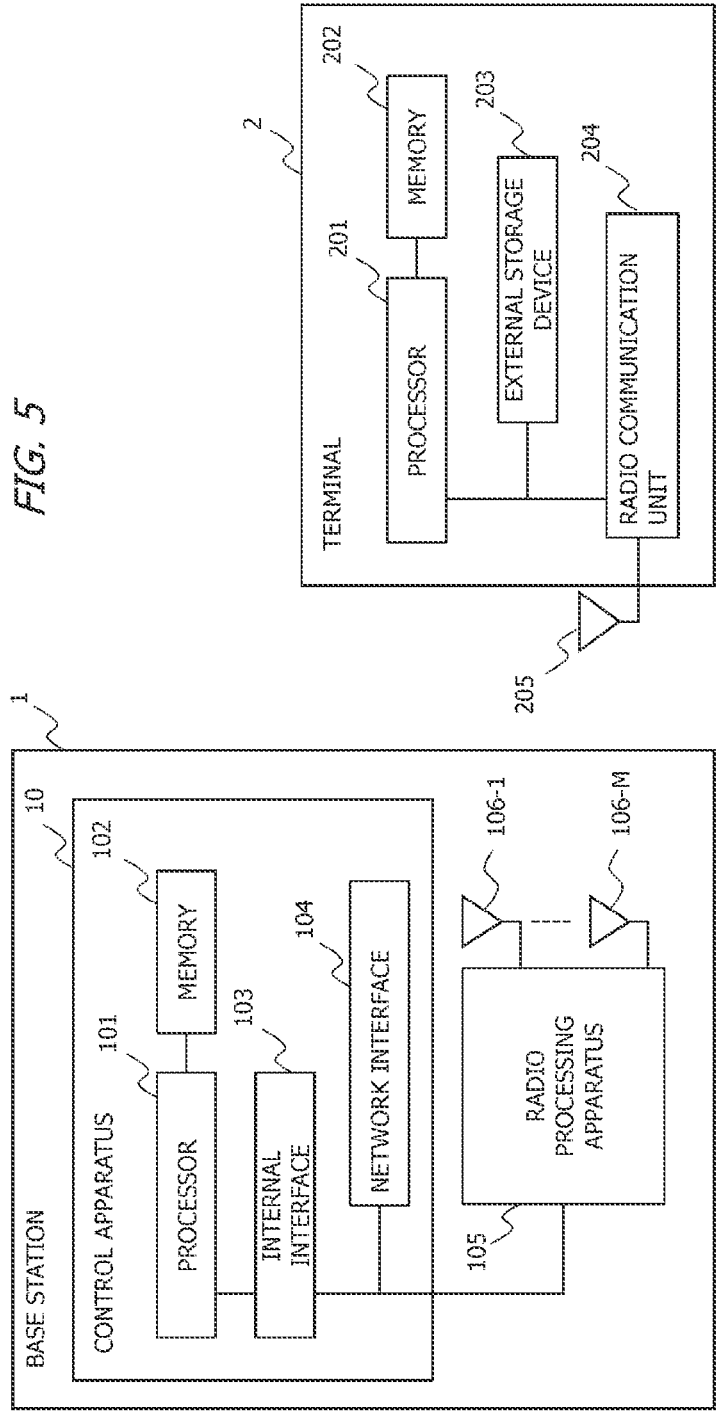
FIG. 5 is a diagram illustrating an example of hardware configurations of the base station and each terminal.

FIG. 5 is a diagram illustrating an example of hardware configurations of the base station 1 and each terminal 2. In FIG. 5, it is assumed that the base station 1 is a reception-side apparatus and each terminal 2 is a transmission-side apparatus. The base station 1 is provided with a control apparatus 10, a radio processing apparatus 105 and M antennas 106.

The control apparatus 10 performs control related to radio communication of the base station 1. The control apparatus 10 has a processor 101, a memory 102, an internal interface 103 and a network interface 104 for communicating with other base stations and the like.

The processor 101 is also called, for example, a central processing unit (CPU) or a microprocessor unit (MPU). The processor 101 is not limited to a single processor but may be in a multi-processor configuration. Further, a single physical CPU connected with a single socket may have a multi-core configuration. Furthermore, the processor 101 may include arithmetic devices with various circuit configurations such as a digital signal processor (DSP) and a graphics processing unit (GPU). The processor 101 may be such that cooperates with an integrated circuit (IC) and other digital circuits or analog circuits. The integrated circuit may be an LSI, an application specific integrated circuit (ASIC) or such that includes a programmable logic device (PLD). The PLD may be such that includes, for example, a field-programmable gate array (FPGA). Therefore, the processor 101 may be such that is called, for example, a micro controller (MCU), an SoC (system-on-a-chip), a system LSI, a chipset or the like.

The memory 102 stores an instruction sequence (a computer program) executed by the processor 101 or data and the like processed by the processor 101. The processor 101 and the memory 102 may be called baseband units (BBUs). The internal interface 103 is a circuit that connects various peripheral devices to the processor 101.

The network interface 104 is a communication device for the base station 1 to access a network to which other base stations are connected. The network to which the other base stations are connected is also called a backhaul. The backhaul is, for example, a wired network by optical communication.

The radio processing apparatus 105 includes a transmitter that transmits a radio signal, a receiver that receives a radio signal and the like, and is connected to the M antennas 106. The radio processing apparatus 105 may have M transmitter systems and M receiver systems, the number M being the same as the number of antennas.

The control apparatus 10 is an apparatus independent from the base station 1. The base station 1 has the radio processing apparatus 105 and the M antennas 106, and the control apparatus 10 and the base station 1 can be in a configuration of being installed remotely from each other, for example, by being connected via a wired network by optical communication. Further, a configuration is also possible in which a plurality of base stations 1 each of which has the radio processing apparatus 105 and the M antennas 106 are connected to one independent control apparatus 10. In the case of such a configuration, the base stations 1 each of which has the radio processing apparatus 105 and the M antennas 106 are also called remote radio heads, and the network connecting the remote radio heads and the control apparatus 10 is also called a fronthaul.

Each terminal 2 has a processor 201, a memory 202, an external storage device 203, a radio communication unit 204 and an antenna 205. The terminals 2 are, for example, smartphones, tablet terminals, wearable terminals, data communication devices mounted on connected cars, drones and other IoT terminals. In FIG. 5, however, hardware components that perform processing related to radio communication are extracted and illustrated, and hardware components that each terminal 2 is provided with are not limited to those illustrated in FIG. 5.

The processor 201 and the memory 202 are similar to the processor 101 and the memory 102. The external storage device 203 stores various programs and data that the processor 201 uses at the time of executing each program. The external storage device 203 is, for example, an EPROM (erasable programmable ROM) or a hard disk drive. The programs held in the external storage device 203 include, for example, an operating system (OS), a radio signal processing program and other various application programs.

The radio communication unit 204 is a radio communication circuit according to a mobile communication method of 5G (5th generation), 6G or a subsequent generation. The radio communication unit 204 includes a transmitter that transmits a radio signal, a receiver that receives a radio signal and the like, and is connected to the antenna 205. The terminal 2 may be provided with a plurality of antennas 205, and the radio communication unit 204 may connect the plurality of antennas 205. The hardware configurations of the base station 1 and the terminal 2 are not limited to those illustrated in FIG. 5.

Figure 6:
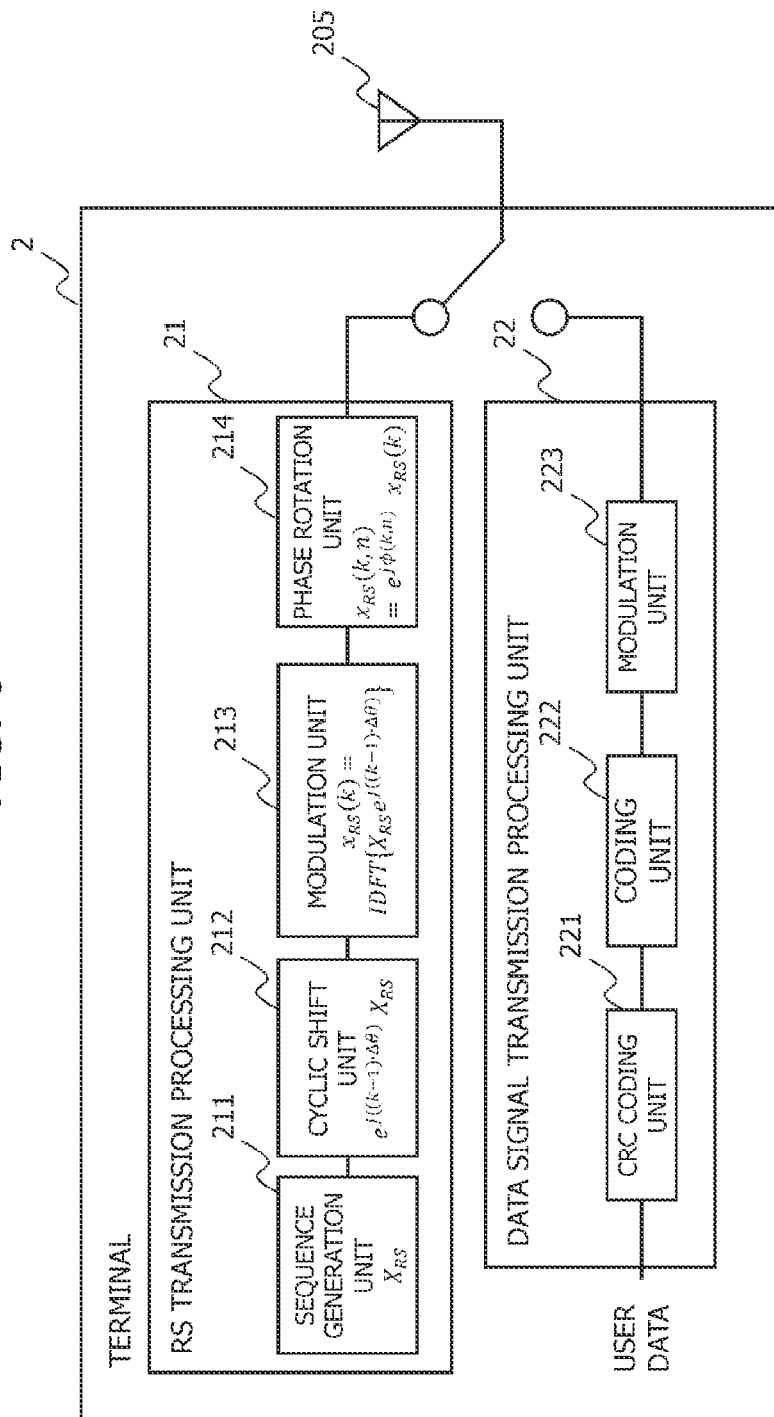
FIG. 6 is a diagram illustrating an example of a functional configuration of each terminal.

FIG. 6 is a diagram illustrating an example of a functional configuration of each terminal 2. The terminal 2 is provided with an RS transmission processing unit 21 and a data signal transmission processing unit 22 as the functional configuration. Each of processes by these functional components is achieved by the processor 201 of the terminal 2 executing the radio signal processing program. The functional configuration of the terminal 2 illustrated in FIG. 6 relates to processes on the signal transmission side.

The RS transmission processing unit 21 performs a process from generation of a reference signal to transmission of the reference signal. The RS transmission processing unit 21 is provided with a sequence generation unit 211, a cyclic shift unit 212, a modulation unit 213 and a phase rotation unit 214. The sequence generation unit 211 generates a sequence X_RS in the frequency domain using an orthogonal sequence, for example, a Zadoff-Chu sequence. In FIG. 6, characters after "_" are represented by subscripts. Further, X_RS represented by uppercase letters indicates a signal in the frequency domain and x_RS beginning with a lowercase letter indicates a signal in the time domain.

The cyclic shift unit 212 causes the starting point of the sequence X_RS generated by the sequence generation unit 211 to be cyclically shifted by a predetermined number of samples to acquire a sequence used as a reference signal. A cyclic shift means to shift the starting point of the sequence X_RS and move a sequence up to the shifted starting point to the end to generate a sequence with the same size. The cyclic shift unit 212 performs such a cyclic shift as above in the frequency domain.

The sequence X_RS generated by the sequence generation unit 211 is a sequence common to the K terminals 2 that simultaneously perform transmission. Therefore, if the sequence X_RS is used as it is, RS's interfere with one another among the terminals 2. Therefore, sequences used by the terminals 2 are caused to be different. The cyclic shift unit 212 shifts the starting point of the sequence X_RS by a predetermined number of samples according to each terminal 2. By the starting point of the sequence X_RS being different for each terminal 2, a sequence used for an RS by each terminal 2 is different. In FIG. 6, a reference signal obtained at the cyclic shift unit 212 is illustrated as a complex number in the frequency domain. Here, k is a value corresponding to the terminal 2 itself among the K terminals that simultaneously perform transmission. The number of samples at the time of causing the sequence X_RS to be cyclically shifted is illustrated as a phase difference when being illustrated as a complex number in the frequency domain, and "$\Delta\theta$" in FIG. 6 indicates a phase difference between two adjoining terminals 2. Adjoining terminals 2 refer to such two terminals that values of k indicating the terminals 2 among the K terminals are consecutive. For example, a terminal 2 indicated by k=1 and a terminal 2 indicated by k=2 are adjoining terminals 2.

The modulation unit 213 performs, for example, inverse discrete Fourier transform (IDFT) for the reference signal obtained by the cyclic shift unit 212 and performs modulation for converting a signal in the frequency domain to a signal in the time domain. The reference signal obtained by the modulation unit 213 is expressed as x_RS(k). In FIG. 6, the reference signal x_RS(k) is expressed as a complex number. In FIG. 6, "IDFT" indicates inverse discrete Fourier transform.

The phase rotation unit 214 gives a phase rotation amount $\varphi(k,n)$ to the reference signal x_RS(k) obtained by the modulation unit 213. Here, n indicates which transmission in repetition and takes a value from 1 to N. In FIG. 6, a reference signal x_RS(k,n) obtained by phase rotation by the phase rotation unit 214 is expressed as a complex number. The reference signal x_RS(k,n) obtained by phase rotation by the phase rotation unit 214 is a transmitted reference signal transmitted from the terminal 2.

When the terminal 2 performs repetition, values of reference signals x_RS(k) obtained by the sequence generation unit 211, the cyclic shift unit 212 and the modulation unit 213 is the same in transmissions in the repetition are the same. Since the phase rotation amount $\varphi(k,n)$ given to a reference signal by the phase rotation unit 214 is set for each transmission in repetition, the n-th reference signal in the repetition is x(k,n).

The data signal transmission processing unit 22 is provided with a CRC (cyclic redundancy check) coding unit 221, a coding unit 222 and a modulation unit 223. The CRC coding unit 221 gives a remainder obtained by performing division of a data block of transmission-target user data by a generator polynomial, to the data block as a check bit string. The data block is a bit string. CRC is used for error detection of restored data. When a transmitted data signal from the terminal 2 is demodulated and decoded at the base station 1 to obtain a data block, the base station 1 performs division of the obtained data block by the same generator polynomial as used at the time of CRC coding. If a remainder occurs, an error is detected.

The coding unit 222 performs error correction coding of the data block with the check bit string given by the CRC coding unit 221. An error correction code may be a block code or a convolutional code. The type of coding is not restricted. The modulation unit 223 performs digital modulation of the error-correction coded data. A method for the digital modulation is, for example, quadrature amplitude modulation (QAM) or phase shift keying (PSK). After that, a data signal is outputted to the radio communication unit 204 and is transmitted from the antenna 205.

When the terminal 2 is provided with a plurality of antennas 205, transmit diversity processing is performed for the signal that has been digitally modulated by the modulation unit 223. In the transmit diversity processing, the digitally modulated signal is separated into a plurality of signals; coefficients given as complex numbers are given to the separated signals, and the signals are radiated from the plurality of antennas 205 through the radio communication unit 204.

The functional configuration related to processes on the transmission side of a signal of each terminal 2 is displayed in FIG. 6. Additionally, the terminal 2 has also a functional configuration for performing processes on the signal reception side. For example, the terminal 2 receives phase rotation amounts $\varphi(k,n)$ (n=1, . . . , N) that the terminal 2 uses for transmissions in repetition, from the base station 1.

Figure 7:
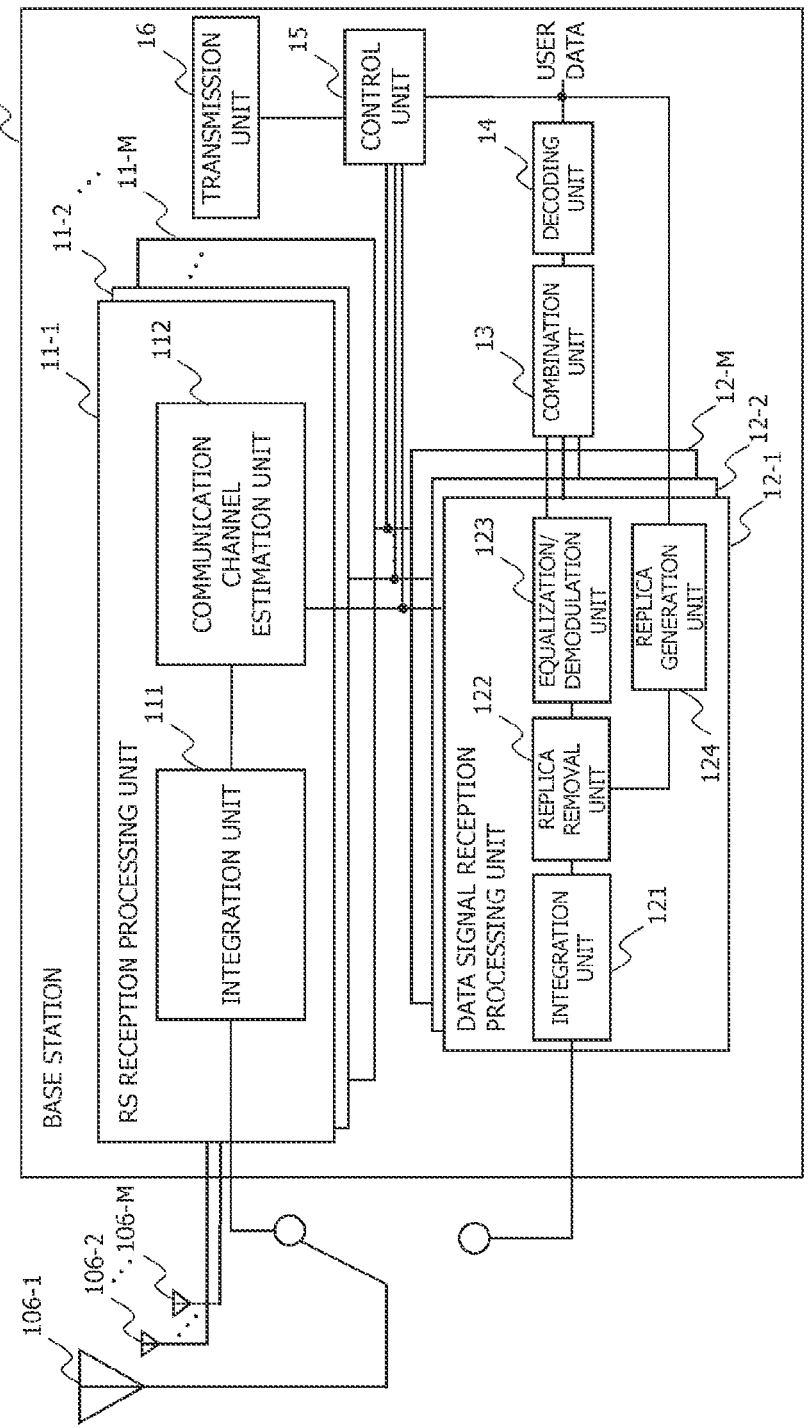
FIG. 7 is a diagram illustrating an example of a functional configuration of the base station.

FIG. 7 is a diagram illustrating an example of a functional configuration of the base station 1. The base station 1 is provided with RS reception processing units 11-1, 11-2, . . . , 11-M, data signal reception processing units 12-1, 12-2, . . . , 12-M, a combination unit 13, a decoding unit 14, a control unit 15 and a transmission unit 16 as functional components. Each of processes of these functional components is performed by the processor 101 executing a predetermined program. When the RS reception processing units 11-1, 11-2, . . . , 11-M are generically called, they are referred to as the RS reception processing units 11. When the data signal reception processing units 12-1, 12-2, . . . , 12-M are generically called, they are referred to as the data signal reception processing units 12. When antennas 106-1, 106-2, . . . , 106-M are generically called, they are referred to as the antennas 106. It is assumed that the RS reception processing units 11 and the data signal reception processing units 12 correspond to the same antennas 106, respectively, unless otherwise stated. Description will be made below without limiting the antennas 106, the RS reception processing units 11 and the data signal reception processing units 12 to particular antennas 106, particular RS reception processing units 11 and particular data signal reception processing units 12. Further, description will be made on signal processing when each terminal 2 performs repetition.

At the time of starting data transmission of each terminal 2, the control unit 15 transmits transmission parameters specifying radio resources that can be used for the data transmission and permission of communication. Further, the control unit 15 gives instructions to start and end repetition, to each terminal 2. The control unit 15 determines start of repetition, for example, when the SNR of a received signal of each terminal 2 is lower than a predetermined value. The control unit 15 determines end of the repetition by receiving a data signal from each terminals 2. The transmission parameters, the permission of communication, the instruction to start repetition and the instruction to end the repetition are transmitted to each terminal 2 via a control channel.

The control unit 15 notifies each of the terminals 2 of the repetition parameters including the phase rotation amount $\varphi(k,n)$ that the terminal k uses to transmit the n-th reference signal, with an instruction to start the repetition. Details of a process for acquiring the repetition parameters will be described later.

The transmission unit 16 transmits a signal inputted from the control unit 15 to each terminal 2. In the control unit 15, for example, processes similar to the processes of the RS transmission processing unit 21 and data signal transmission processing unit 22 of each terminal 2 are performed, and a signal is sent out from the antenna 106 through the radio processing apparatus 105.

The RS reception processing unit 11 performs a reception process for a received reference signal received by the antenna 106. The RS reception processing unit 11 is provided with an integration unit 111 and a communication channel estimation unit 112. The integration unit 111 adds received reference signals from the K terminals 2 corresponding to N times in repetition. Thereby, a received reference signal with a sufficient SNR is obtained.

The communication channel estimation unit 112 estimates communication channels from the K terminals 2 to the antenna 106, from the received reference signals. In the communication channel estimation, estimated values of amplitude and phase fluctuation amounts on the communication channels between the terminals 2 and the antenna 106 are obtained as estimation results. A matrix with estimated results of communication channels between the terminal k (k=1, ..., K) and the antenna 106-$m$ (m=1, ..., M) as elements is called a K×M channel matrix H. That is, at the communication channel estimation unit 112, a K×1 channel vector Hm that includes estimated values of amplitude and phase fluctuation amounts on communication channels between one antenna 106 and the terminals 2 is acquired. The data signal reception processing unit 12 is notified of the acquired channel vector Hm. Details of processes of the integration unit 111 and the communication channel estimation unit 112 will be described later.

The data signal reception processing unit 12 performs a reception process for a received data signal received by the antenna 106. The data signal reception processing unit 12 includes an integration unit 121, a replica removal unit 122, an equalization/demodulation unit 123 and a replica generation unit 124.

The integration unit 121 adds received data signals (superimposed signals) from the K terminals 2 corresponding to N times in repetition. The replica removal unit 122 subtracts a replica signal of a received data signal from a terminal 2 generated by the replica generation unit 124, from the received data signal (the superimposed signal). The equalization/demodulation unit 123 separates a received data signal from a terminal 2 with the next largest received signal power from the received data signal (the superimposed signal) from which the replica signal of the terminal k has been subtracted, using the channel vector Hm corresponding to the antenna 106 acquired by the communication channel estimation unit 112, and demodulates the received data signal. By multiplying the received data signal (the superimposed signal), for example, by an MMSE (minimum mean square error) weight, interference from the other terminals 2 is suppressed, and a received data signal from the terminal 2 is acquired. The MMSE weight is acquired from the channel vector Hm. A log-likelihood ratio corresponding to an error correction codeword bit string from the terminal 2 is acquired by the equalization/demodulation unit 123, and the bit string is outputted to the combination unit 13.

If received data from a terminal 2 that has been decoded, which is outputted from the decoding unit 14, is determined to have no error as a result of error detection by CRC, the replica generation unit 124 generates a replica signal of the received data signal transmitted from the terminal 2 and received by the receiving antenna 106. Specifically, the replica generation unit 124 generates the replica signal by performing error correction coding of the data outputted from the decoding unit 14 again, digitally modulating a bit string obtained by the error correction coding and performing multiplication by the channel vector Hm. The generated replica signal is outputted to the replica removal unit 122, and the replica removal unit 122 removes the replica signal from the received data signal. By the replica removal unit 122, the equalization/demodulation unit 123 and the replica generation unit 124 repeatedly executing the above process K−1 times, a received data signal from each terminal 2 is obtained.

The combination unit 13 combines log-likelihood ratios corresponding to error correction codeword bit strings from the terminals 2 outputted from the data signal reception processing units 12-1, 12-2, ..., 12-M and received by each of the M antennas 106-1, 106-2, ..., 106-M. The decoding unit 14 decodes an error correction code from a log-likelihood ratio inputted from the combination unit 13 to acquire data. The functional configuration of the base station 1 is not limited to that illustrated in FIG. 7.

<Process Flow>

Figure 8:
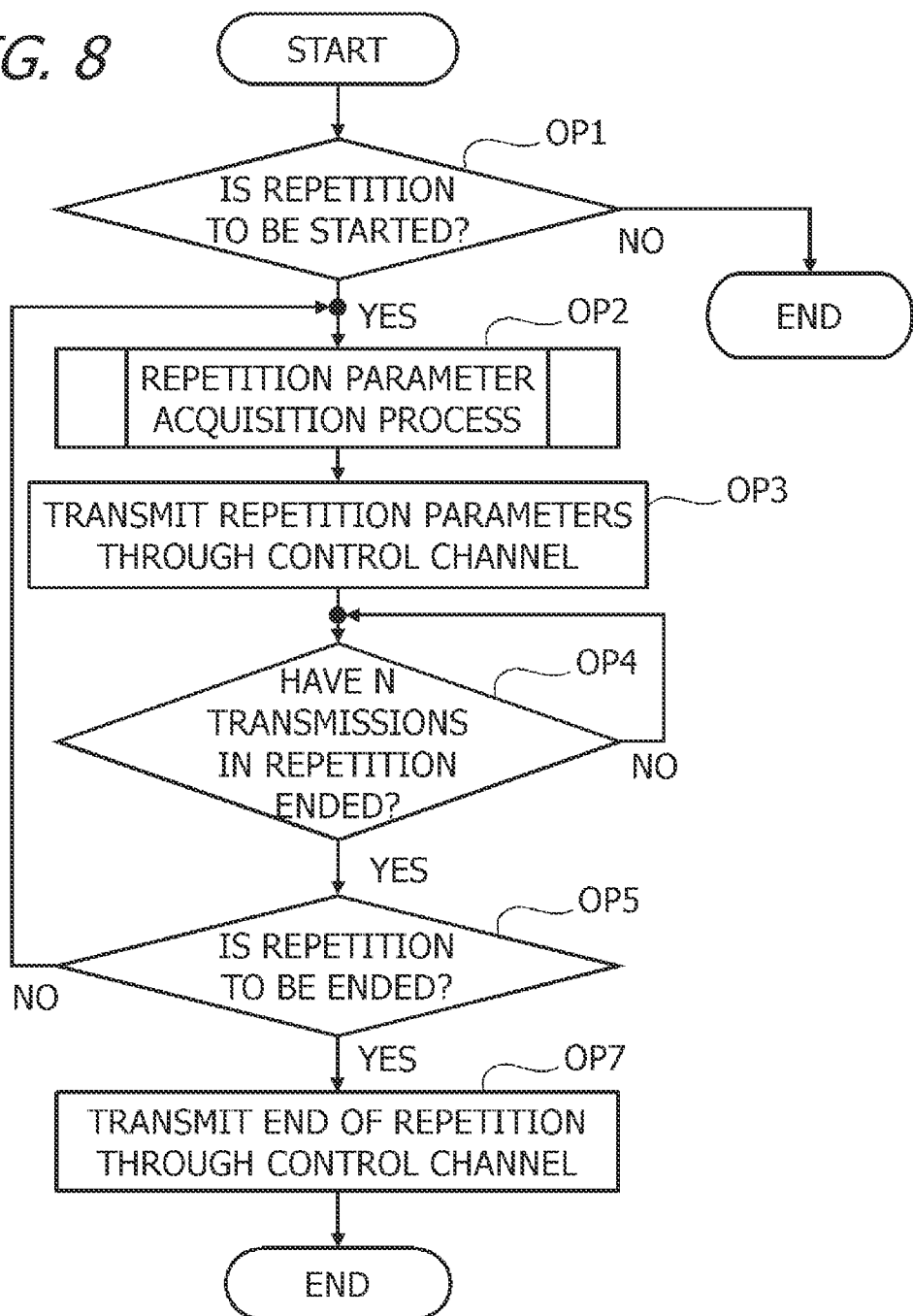
FIG. 8 is a flowchart of a repetition control process by the base station.

FIG. 8 is a flowchart of a repetition control process by the base station 1. The process illustrated in FIG. 8 is repeatedly executed in a predetermined period. Though the subject of execution of the process illustrated in FIG. 8 is the processor 101, description will be made with a functional component as the subject for convenience. The same goes for subsequent flowcharts.

At OP1, the control unit 15 determines whether or not to start repetition. For example, when the SNR of a received signal from the terminals 2 is below a predetermined value, the control unit 15 determines that repetition is to be started. For example, this determination may be made based on an average value of SNRs from the K terminals 2 that are simultaneously performing transmission or may be made based on the largest or smallest SNR among SNRs of the K terminals 2. Or alternatively, SNRs of received signals of y terminals 2 (y≤K) among the K terminals 2 are below a predetermined value, it may be determined that repetition is to be started. If it is determined that repetition is to be started (OP1: YES), the process proceeds to OP2. If it is not determined that repetition is to be started (OP1: NO), the process illustrated in FIG. 8 ends.

At OP2, the control unit 15 executes a repetition parameter acquisition process. The repetition parameter acquisition process is a process for acquiring parameters that the terminals 2 use in repetition. Details of the repetition parameter acquisition process will be described later. In the repetition parameter acquisition process, for example, the number of times of repetition N, transmission power of each terminal 2, a reference signal x_RS(k) transmitted by each terminal 2, and a phase rotation amount φ(k,n) (n=1, ..., N) used for each transmission of a reference signal in repetition of each terminal 2 are acquired as repetition parameters.

At OP3, the control unit 15 transmits the acquired repetition parameters, an instruction to start repetition, and a frequency and slots used in repetition to the K terminals 2 through a downlink control channel.

At OP4, the control unit 15 determines whether N transmissions in repetition by the K terminals 2 have ended or not. If the N transmissions in the repetition by the K terminals 2 have ended (OP4: YES), the process proceeds to OP5. Until the N transmissions in the repetition by the K terminals 2 end (OP4: NO), the control unit 15 waits.

At OP5, the control unit 15 determines whether or not to end the repetition. For example, when a received data signal from the terminals 2 is obtained, the control unit 15 determines that the repetition is to be ended. If it is determined that the repetition is to be ended (OP5: YES), the process proceeds to OP7. If it is not determined that the repetition is to be ended (OP5: NO), the process proceeds to OP2, where the repetition parameter acquisition process is performed for the next repetition, and repetition parameters are newly acquired.

Figure 9:
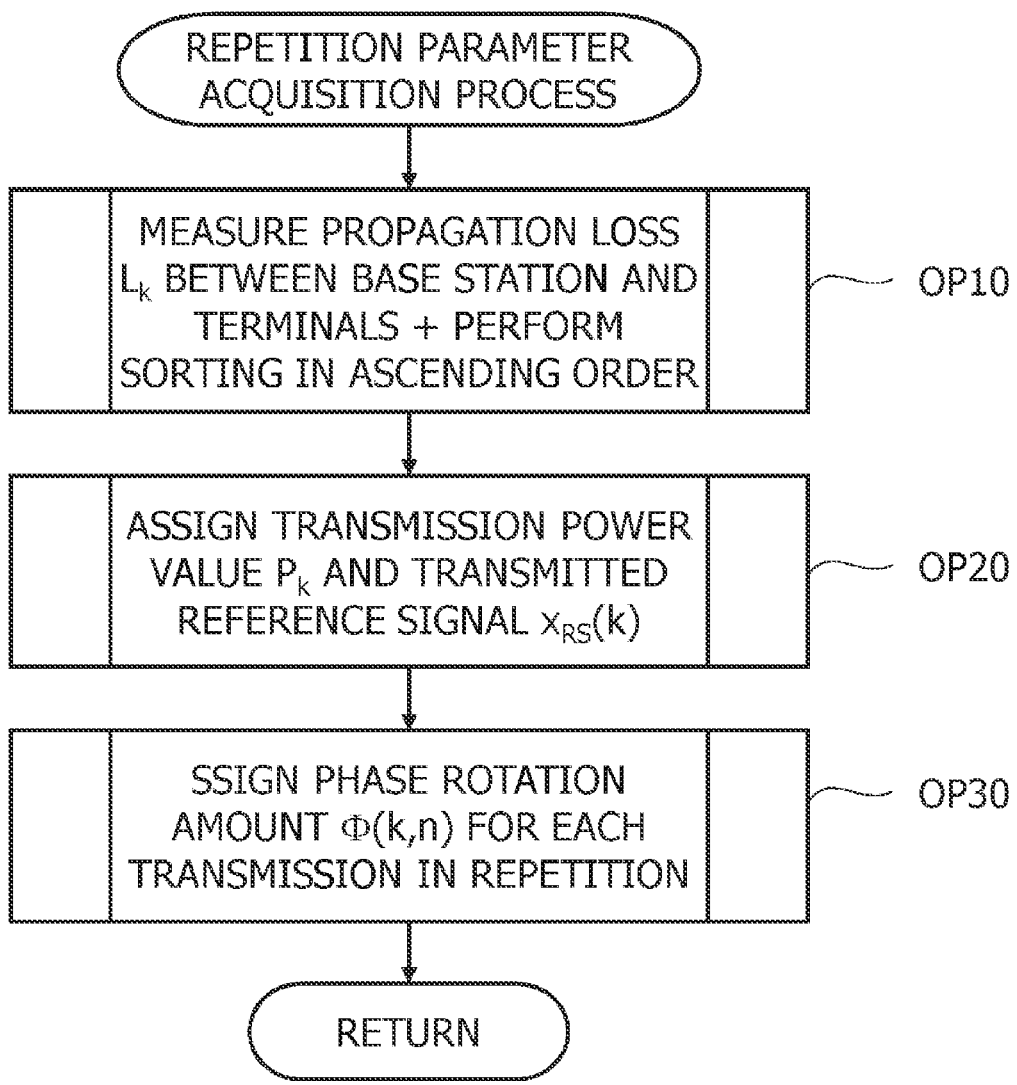
FIG. 9 illustrates an example of a flowchart of the repetition parameter acquisition process of the base station.

FIG. 9 illustrates an example of a flowchart of the repetition parameter acquisition process of the base station 1. The process illustrated in FIG. 9 is the process executed at OP2 in FIG. 8.

At OP10, the control unit 15 performs measurement of propagation loss Lk between the base station 1 and the terminal k (k=1, . . . , K) and sorting of the K terminals 2 in ascending order of the propagation the loss Lk. At OP20, the control unit 15 assigns a transmission power value Pk and a transmitted reference signal x_RS(k) for each terminal k. At OP30, the control unit 15 assigns the phase rotation amount φ(k,n) that the terminal k uses for each transmission in the repetition. Details of the processes of OP10, OP20 and OP30 will be described later. When the process of OP30 ends, the process proceeds to OP3 in FIG. 8.

Figure 10:
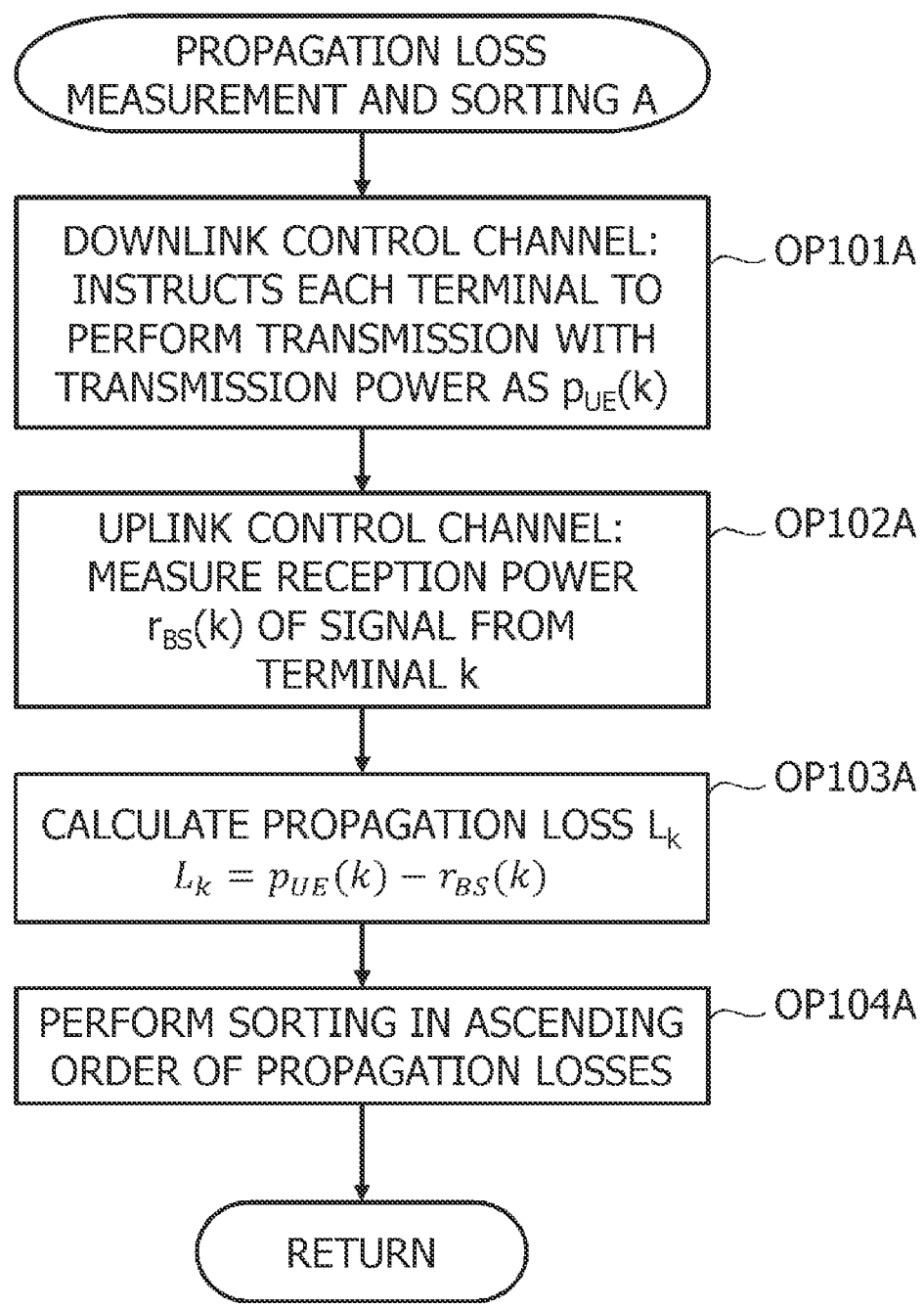
FIG. 10 illustrates a process in the case of the base station measuring a received signal strength.
Figure 11:
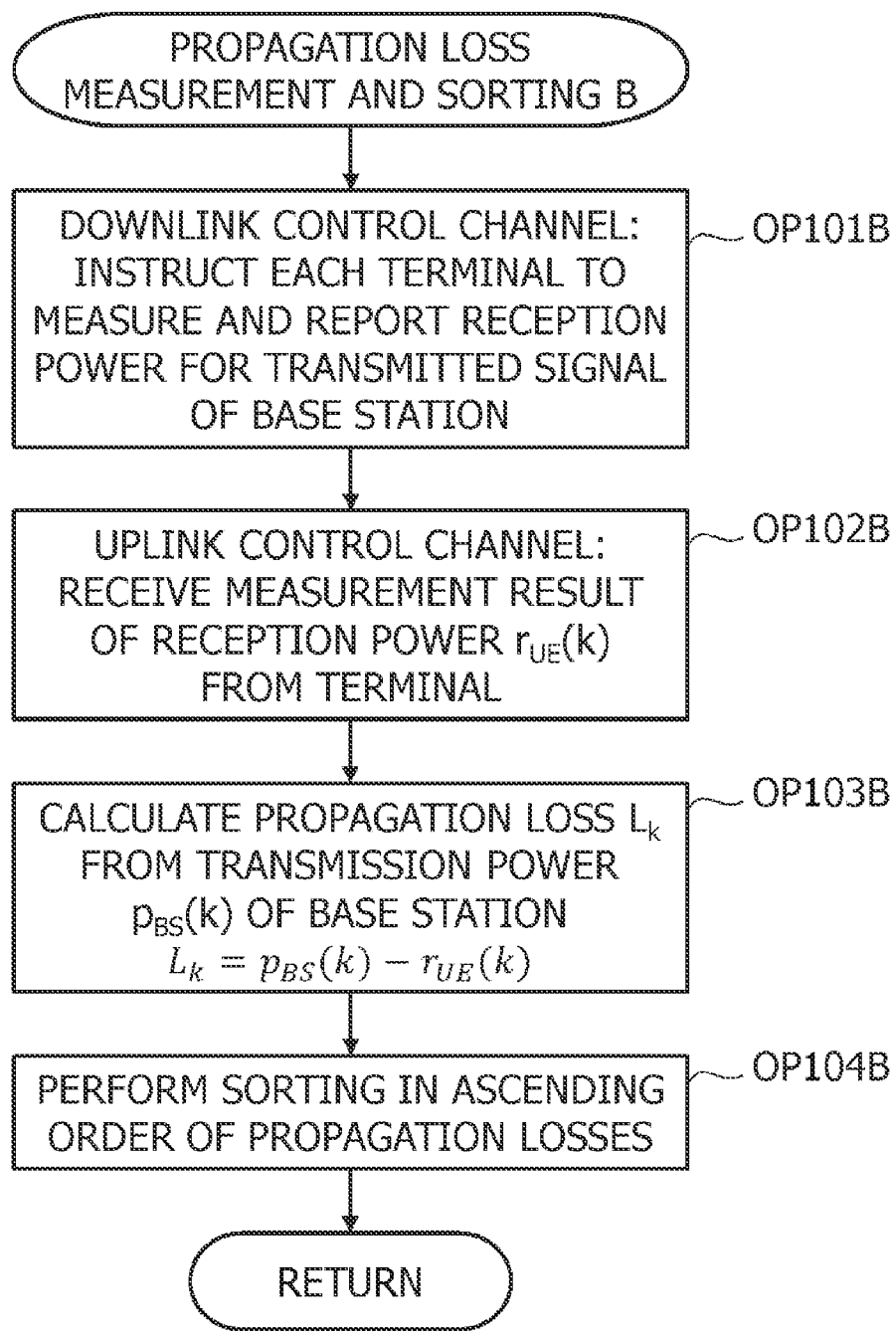
FIG. 11 illustrates a process in the case of each terminal measuring a received signal strength.

Each of FIGS. 10 and 11 illustrates examples of a flowchart of the process for the measurement of the propagation loss Lk between the base station 1 and the terminal k and the sorting of the terminals 2 in ascending order of the propagation loss Lk at OP10 in FIG. 9. As the process at OP10 in FIG. 9, the process in either FIG. 10 or FIG. 11 may be performed.

FIG. 10 illustrates a process in the case of the base station 1 measuring a received signal strength. At OP101A, the control unit 15 instructs each of the K terminals 2 to transmit a signal with transmission power as p_UE(k) (k=1, . . . , K) through the downlink control channel. At OP102A, the control unit 15 measures reception power r_BS(k) of a transmitted signal from each terminal k on the uplink control channel. At OP103A, the control unit 15 subtracts the reception power r_BS(k) measured at OP102A from the transmission power p_UE(k) specified at OP101A to acquire a propagation loss Lk of the terminal k. At OP104A, the control unit 15 sorts the K terminals 2 in ascending order of the propagation losses. After that, the process proceeds to OP20 in FIG. 9.

When the base station 1 is provided with a plurality of antennas, the propagation loss of the terminal k is acquired for each antenna, and an average value of propagation losses of the terminal k for all the antennas may be acquired as the propagation loss Lk.

FIG. 11 illustrates a process in the case of each terminal 2 measuring a received signal strength. At OP101B, the control unit 15 transmits a signal to each of the K terminals 2 with transmission power p_BS(k) (k=1, . . . , K) through the downlink control channel and instructs the terminal 2 to measure and report reception power of the signal. At OP102B, the control unit 15 receives a measurement result of reception power r_UE(k) of the transmitted signal transmitted by the base station 1 at OP101B, from the terminal k through the uplink control channel. At OP103B, the control unit 15 subtracts the reception power r_UE(k) received from the terminal k at OP102B, from the transmission power p_BS(k) of the signal transmitted at OP101B to acquire a propagation loss Lk of the terminal k. At OP104B, the control unit 15 sorts the K terminals 2 in ascending order of the propagation losses. After that, the process proceeds to OP20 in FIG. 9.

Figure 12:
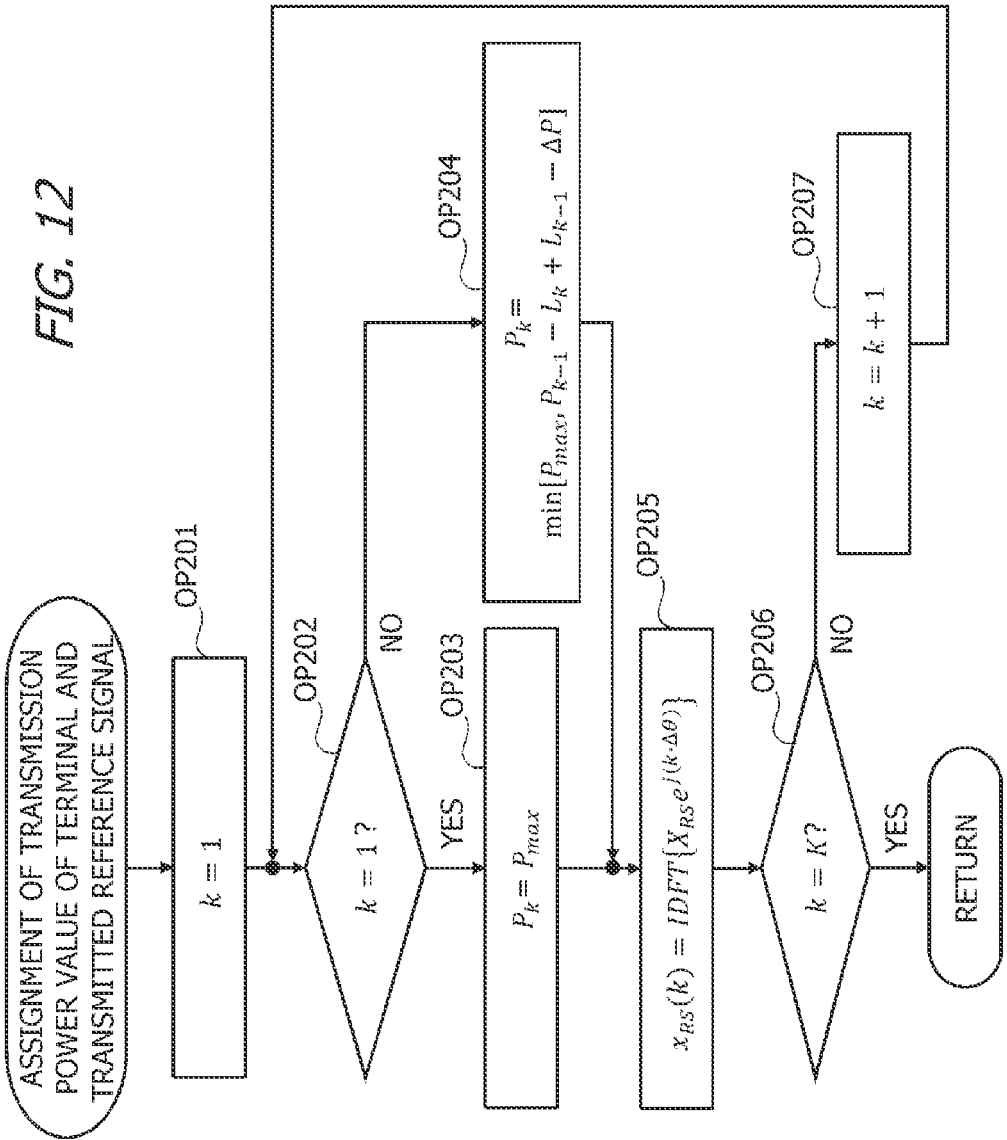
FIG. 12 illustrates an example of a flowchart of a process of assignment of a transmitted power value Pk and a transmitted reference signal x_RS(k) for each terminal k.

FIG. 12 illustrates an example of a flowchart of a process of assignment of a transmitted power value Pk and a transmitted reference signal x_RS(k) for each terminal k. The process illustrated in FIG. 12 is the process executed at OP20 in FIG. 9. In the process illustrated in FIG. 12, a variable k indicates a position of each terminal 2 when the terminals 2 are sorted in an ascending order of the propagation loss Lk.

At OP201, the control unit 15 sets the variable k to 1. At OP202, the control unit 15 determines whether the variable k is 1 or not. If the variable k is 1 (OP202: YES), the process proceeds to OP203. If the variable k is not 1 (OP202: NO), the process proceeds to OP204.

At OP203, the control unit 15 sets the transmission power value Pk of the terminal k to maximum transmission power P_max. At OP204, the control unit 15 determines, as the transmission power value Pk of the terminal k, a smaller value between the maximum transmission power P_max and a value obtained by subtracting a difference between the propagation loss Lk of the terminal k and a propagation loss Lk−1 of a terminal k−1, and a power difference ΔP requested among terminals from the transmission power value Pk−1 of the terminal k−1.

At OP205, the control unit 15 determines a transmitted reference signal x_RS(k) of the terminal k. How to determine the transmitted reference signal x_RS(k) is the same as the case of each terminal 2 (see FIG. 6). At OP206, the control unit 15 determines whether the variable k is K or not. If the variable k is K (OP206: YES), the process illustrated in FIG. 12 ends, and the process proceeds to OP30 in FIG. 9. If the variable k is not K (OP206: NO), the process proceeds to OP207. At OP207, the control unit 15 adds 1 to the variable k and updates the variable k. After that, the process proceeds to OP202, where a transmission power value Pk and a transmitted reference signal r_RS(k) are determined for the next terminal k.

According to the process in FIG. 12, a transmission power value for each terminal 2 is determined so that, for a terminal 2 with a smaller propagation loss, a received signal power value at the base station 1 is larger. Further, the transmission power value Pk for the terminal k is determined so that a power difference between the terminal k−1 and the terminal k becomes at least the requested power difference ΔP. Therefore, received signals of all the terminals 2 can be separated in SIC (see FIG. 2).

Figure 13:
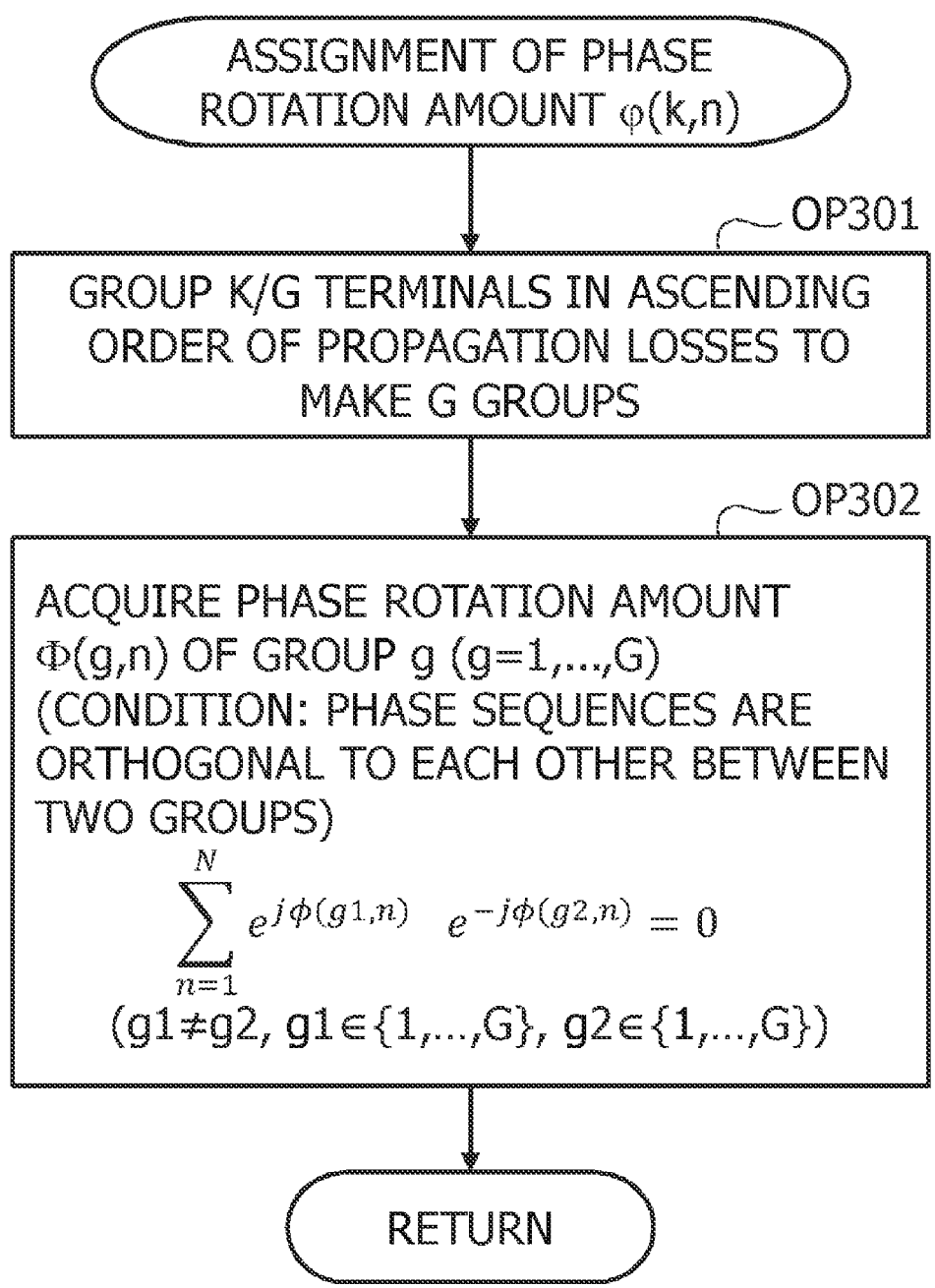
FIG. 13 illustrates an example of a flowchart of a process for assigning the phase rotation amount $\varphi(k,n)$ that each terminal uses in each transmission in repetition.

FIG. 13 illustrates an example of a flowchart of a process for assigning the phase rotation amount φ(k,n) that each terminal 2 uses in each transmission in repetition. The process illustrated in FIG. 13 is the process executed at OP30 in FIG. 9.

At OP301, the control unit 15 divides the K terminals 2 into G groups. In the first embodiment, each K/G terminals 2 in ascending order of the propagation loss Lk are grouped. Specifically, when there are nine terminals 2 that simultaneously perform transmission, and the nine terminals 2 are divided into three groups, a group #1 is made of three terminals 2 with the first to third smallest propagation loss Lk, a group #2 is made of three terminals 2 with the fourth to sixth smallest propagation loss Lk, and a group #3 is made of three terminals 2 with the seventh to ninth smallest propagation loss Lk. The grouping is not limited to being performed based on propagation losses but may be performed, for example, based on received signal powers or SNRs of received signals.

At OP302, the control unit 15 acquires a phase rotation amount φ(g,n) that terminals 2 belonging to each group use for each transmission in repetition. The phase rotation amount φ(g,n) is determined such that Expression 1 below is satisfied.

$$\sum_{n=1}^{N} e^{j\phi(g1,n)} \cdot e^{-j\phi(g2,n)} = 0$$

$$g1 \in \{1, \ldots, G\}$$
$$g2 \in \{1, \ldots, G\}$$
$$g1 \neq g2$$

EXPRESSION 1

Each of g1 and g2 is a variable indicating a group, and takes an integer value from 1 to G. Further, g1≠g2 is assumed. That is, for each of combinations of two groups among the G groups, the phase rotation amount φ(g,n) is acquired such that a phase sequence Φg1 of one group g1 and a phase sequence Φg2 of the other group g2 are orthogonal to each other. The phase sequence Φg includes the phase rotation amount φ(g,n) assigned to terminals 2 belonging to the group g. Specifically, the phase sequence Φ1 of the group #1 (g=1) is a phase sequence Φ1={φ(1,1), φ(1,2), . . . , φ(1,N)}.

For example, when three groups are made, the phase rotation amount φ(k,n) is determined such that the phase sequence Φ1 of the group #1 and the phase sequence Φ2 of the group #2 are orthogonal to each other, the phase sequence Φ1 of the group #1 and the phase sequence Φ3 of the group #3 are orthogonal to each other, and the phase sequence Φ2 of the group #2 and the phase sequence Φ3 of the group #3 are orthogonal to each other.

The phase rotation amount φ(k,n) that the terminal k uses in the n-th transmission in repetition is acquired as the phase rotation amount φ(g,n) of the group g to which the terminal k belongs. After the process of OP 302 ends, the process proceeds to OP3 in FIG. 8.

Figure 14:
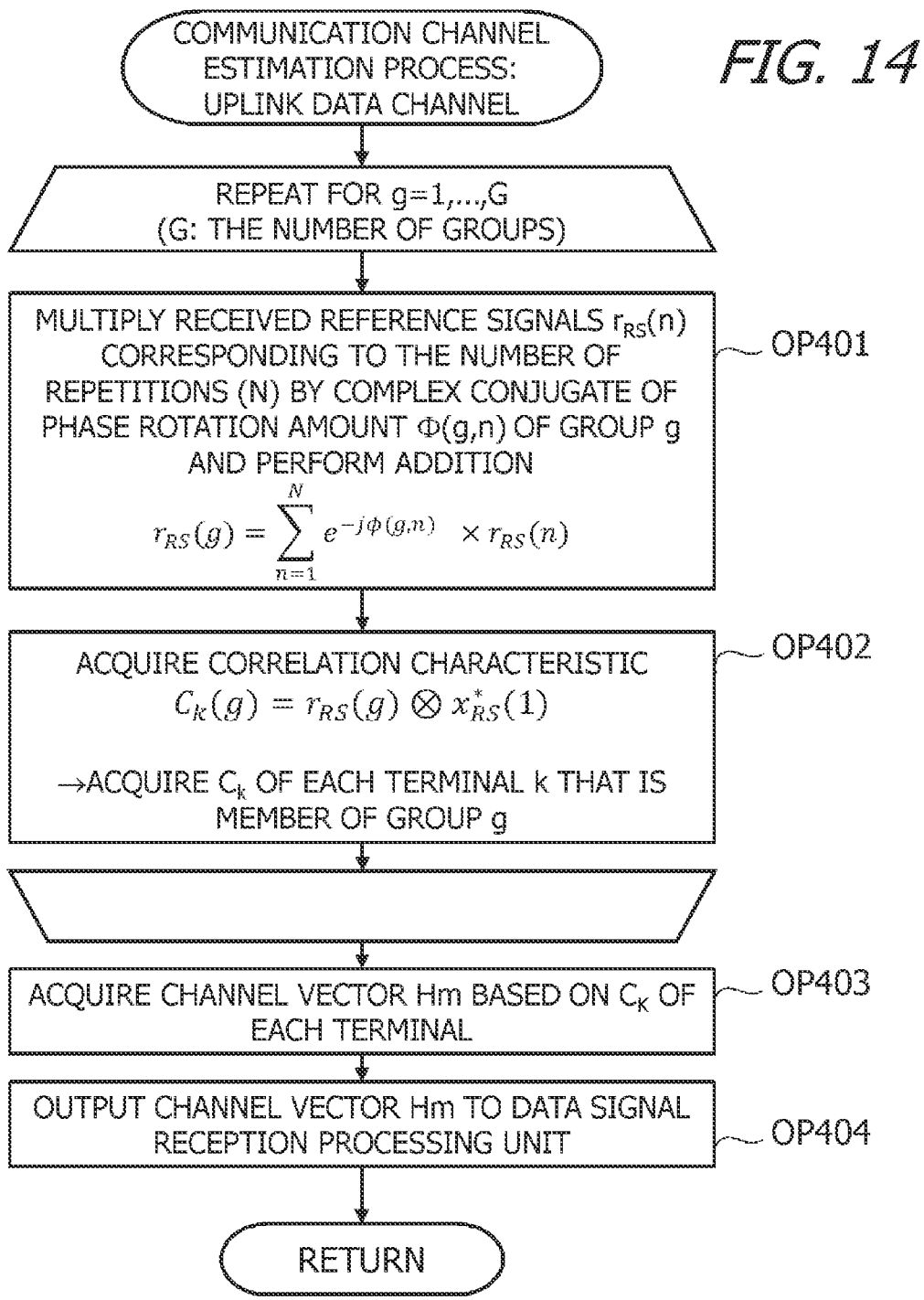
FIG. 14 illustrates an example of a flowchart of a communication channel estimation process at the base station.

FIG. 14 illustrates an example of a flowchart of a communication channel estimation process at the base station 1. The process illustrated in FIG. 14 is started when a reference signal is received by repetition.

A process from OP401 to OP402 is performed for each group and is repeatedly executed the number of times corresponding to the number of groups G. The group g (g∈{1, . . . , G}) indicates a processing target group.

At OP401, the integration unit 111 acquires r_RS(g) by giving a phase rotation amount opposite to the phase rotation amount φ(g,n) of the group g to a received reference signal r_RS(n) received by the receiving antenna 106 by each reference signal transmission in repetition, and adding the first to N-th received reference signals. The process of OP401 is indicated by Expression 2 below.

$$r_{RS}(g) = \sum_{n=1}^{N} e^{-j\phi(g,n)} r_{RS}(n)$$

EXPRESSION 2

Here, r_RS(n) is expressed by Expression 3 below. Here, h_k indicates amplitude and phase fluctuation amounts on a communication channel from the terminal k to the receiving antenna 106.

$$r_{RS}(n) = \sum_{k=1}^{K} h_k e^{j\phi(k,n)} x_{RS}(n)$$

EXPRESSION 3

When attention is paid to the terminal k, a received reference signal r_RS(k,n) from the terminal k is expressed by Expression 4 below. The group g is a group to which the terminal k belongs.

$$r_{RS}(g,n) = h_k \cdot e^{j\Phi(g,n)} \cdot x_{RS}(k,n)$$

EXPRESSION 4

Here, attention is paid to a terminal s not belonging to the group g. By giving a phase rotation amount opposite to the phase rotation amount φ(g,n) of the group g to a received reference signal r_RS(s,n) from the terminal s to perform multiplication and adding the first to N-th received reference signals, the obtained expression can be developed like Expression 5 below.

$$\sum_{n=1}^{N} e^{-j\phi(g,n)} \cdot r_{RS}(n) = h_s \left( \sum_{n=1}^{N} e^{-j\phi(g,n)} \cdot e^{j\phi(i,n)} \right) \cdot x_{RS}(s, n)$$

EXPRESSION 5

In Expression 5, φ(i,n) indicates a phase rotation amount used for the n-th transmission in repetition of a group i to which the terminal s belongs. Expression 1 is included in Expression 5, and 0 is obtained. That is, by giving the phase rotation amount opposite to the phase rotation amount (φ(g,n) of the group g to the received reference signal r_RS(s,n) from the terminal s not belonging to the group g and adding the first to N-th received reference signals, the received reference signal r_RS(s,n) from the terminal s not belonging to the group g is cancelled.

Attention is paid to the terminal k belonging to the group g. Then, by giving the phase rotation amount opposite to the phase rotation amount φ(g,n) of the group g to the received reference signal r_RS(k,n) from the terminal k and adding the first to N-th received reference signals, the obtained expression can be developed like Expression 6 below.

$$\sum_{n=1}^{N} e^{-j\phi(g,n)} \cdot r_{RS}(k, n) =$$

$$h_k \left( \sum_{n=1}^{N} e^{-j\phi(g,n)} \cdot e^{j\phi(g,n)} \cdot x_{RS}(k, n) \right) = N \times h_k x_{RS}(k, n)$$

EXPRESSION 6

Since 1 is obtained when e^jφ(g,n) is multiplied by e^−jφ(g,n), it is seen that the received reference signal r_RS(k,n) from the terminal k belonging to the group g remains without being cancelled. Here, "^" is a symbol indicating start of an exponential function, and a part following "^" indicates an exponential part. That is, r_RS(g) obtained by giving the phase rotation amount opposite to the phase rotation amount φ(g,n) of the group g to the received reference signal r_RS(n) and adding the first to N-th received reference signals does not include received reference signals from terminals other than the terminal k belonging to the group g.

At OP402, the communication channel estimation unit 112 acquires a correlation characteristic Ck(g) between r_RS(g) and a transmitted reference signal x_RS(1) of a terminal 2 with the smallest propagation loss. The transmitted reference signal x_RS(1) is generated by the control unit 15 and is known to the base station 1. Specifically, the correlation characteristic Ck(g) is obtained by convolution operation between r_RS(g) and a complex conjugate of the transmitted reference signal x_RS(1). A correlation characteristic Ck of the terminal k belonging to the group g can be acquired from the correlation characteristic Ck(g).

When the processes of OP401 and OP402 are executed for each group, the correlation characteristic Ck is acquired for each of the K terminals 2. At OP403, the communication channel estimation unit 112 acquires the channel vector Hm based on the correlation characteristic Ck of each terminal 2. Specifically, since a transmitted reference signal is generated from a sequence obtained by cyclically shifting the same Zadoff-Chu sequence by shifting the starting point by the number of samples that is different for each terminal k, each element of the channel vector Hm of each terminal k appears at a sample position corresponding to the number of samples shifted by the cyclic shift in the correlation characteristic Ck(g). That is, for each terminal k belonging to the group g, each element of the channel vector Hm appears at a different sample position in the correlation characteristic Ck. Next, by cutting out the correlation characteristic Ck within a predetermined range from the sample position corresponding to the terminal k using a window function, estimated values of the amplitude and phase fluctuation amounts h_k on a communication channel between the terminal k and the receiving antenna 106 is acquired.

At OP404, the communication channel estimation unit 112 outputs the acquired channel vector Hm to the data signal reception processing unit 12. After that, the process illustrated in FIG. 14 ends.

In the example illustrated in FIG. 14, after giving the phase rotation amount opposite to the phase rotation amount φ(g,n) of the group g to the received reference signal r_RS(n) by the n-th transmission in repetition, received reference signals corresponding to N times are added, and, after that, a correlation characteristic is acquired. The process for acquiring the correlation characteristic, however, is not limited thereto. The correlation characteristic Ck(g) is indicated, for example, by Expressions 7 and 8 below.

$$C_k(g) = \sum_{n=1}^{N} e^{-j\phi(g,n)} \cdot r_{RS}(n) \cdot x^*_{RS}(1)$$ EXPRESSION 7

$$= \sum_{n=1}^{N} e^{-j\phi(g,n)} c_k(n)$$

$$c_k(n) = r_{RS}(n) \otimes x^*_{RS}(n)$$ EXPRESSION 8

Therefore, the correlation characteristic may be acquired by acquiring a correlation characteristic Ck(n) of the received reference signal r_RS(n) by the n-th transmission in repetition, giving the phase rotation amount opposite to the phase rotation amount φ(g,n) of the group g to the correlation characteristic Ck(n) and adding received reference signals corresponding to N times.

Figure 15:
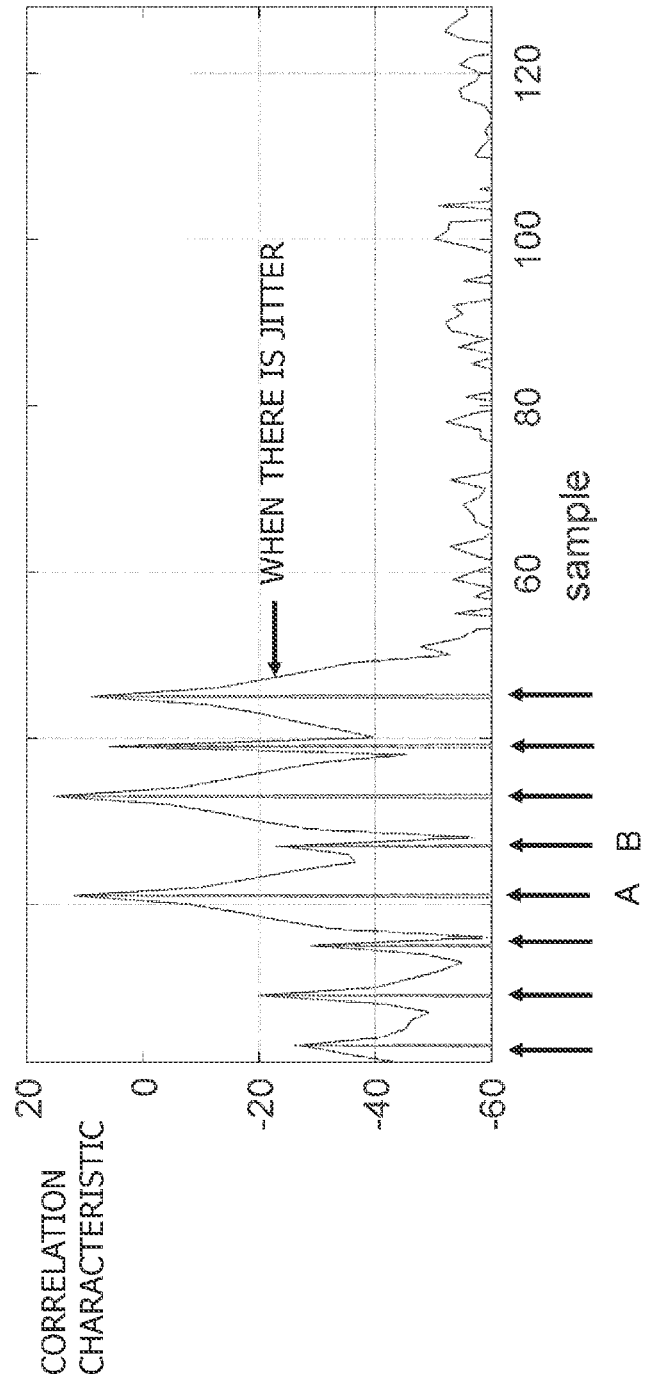
FIG. 15 illustrates an example of a graph illustrating correlation characteristics of a received reference signal at the base station when phase rotation is not performed for transmitted reference signals and received reference signals in repetition of reference signals.

FIG. 15 illustrates an example of a graph illustrating correlation characteristics of a received reference signal at the base station 1 when phase rotation is not performed for transmitted reference signals and received reference signals in repetition of reference signals. The horizontal axis and the vertical axis of the graph in FIG. 15 indicate sample numbers and received signal powers, respectively. In FIG. 15, both of correlation characteristics with jitter and correlation characteristics without jitter are displayed. The jitter refers to a time axis shift or the like at a timing of signal transmission, and it occurs due to movement of terminals 2, apparatus characteristics, surrounding environments and the like. When there is no jitter, a theoretical value is obtained.

When there is no jitter, received signal power appears at sample positions corresponding to the terminals 2 indicated by arrows in FIG. 15. When there is no jitter, there is little spread of the peak of received signal power of each terminal 2, and each terminal 2 is not interfered with by received signal power of other terminals 2 that appear at nearby sample positions. Therefore, it is possible to accurately estimate a communication channel.

On the other hand, if there is jitter, spread of the peak of the received signal power of each terminal 2 tends to be large due to the influence of the jitter. For example, in FIG. 15, since the received signal power of a terminal B near the sample position of a terminal A with large received signal power is smaller in comparison with the terminal A, the peak of the received signal power sinks being influenced by spread of the peak of the received signal power of the terminal A. Thereby, there may be a case where the received signal power (the correlation characteristic) of the terminal B is not acquired, and the accuracy of communication channel estimation may be reduced.

FIG. 16 illustrates examples of a graph illustrating correlation characteristics of a received reference signal at the base station 1 when, in repetition of reference signals, phase rotation is performed for transmitted reference signals and received reference signals like the first embodiment. The graphs illustrated in FIG. 16 are graphs under the same conditions as the graph illustrated in FIG. 15. In FIG. 16, graphs illustrating correlation characteristics of a group 1 and a group 2 in a case where the terminals 2 are grouped in the group 1 of terminals 2 with small received signal power and the group 2 of terminals 2 with large received signal power. In FIG. 16, as for a graph in the case where there is no jitter, the same graph as the case where phase rotation is not performed is displayed being superimposed on each graph.

In the example illustrated in FIG. 16, in the graph for the group 1, the peak of received signal power appears for each of the terminals 2 with small received signal power that are members of the group 1, but the peak of received signal power does not appear for the terminals 2 with large received signal power that are members of the group 2. Similarly, in the graph for the group 2, the peak of received signal power appears for each of the terminals 2 with large received signal power that are members of the group 2, but the peak of received signal power does not appear for the terminals 2 with small received signal power that are members of the group 1. Thereby, it is seen that, for terminals 2 not belonging to the group g, received reference signals are cancelled by adding received reference signals received each time in repetition at the base station 1.

Further, in the graphs for the groups 1 and 2, influence of spread of the peak of received signal power is reduced among terminals 2 that are members of a group, and the peak of received signal power can be read for any terminal 2. Therefore, according to the radio communication system 100 according to the first embodiment, it is possible to estimate a communication channel more accurately.

Figure 17:
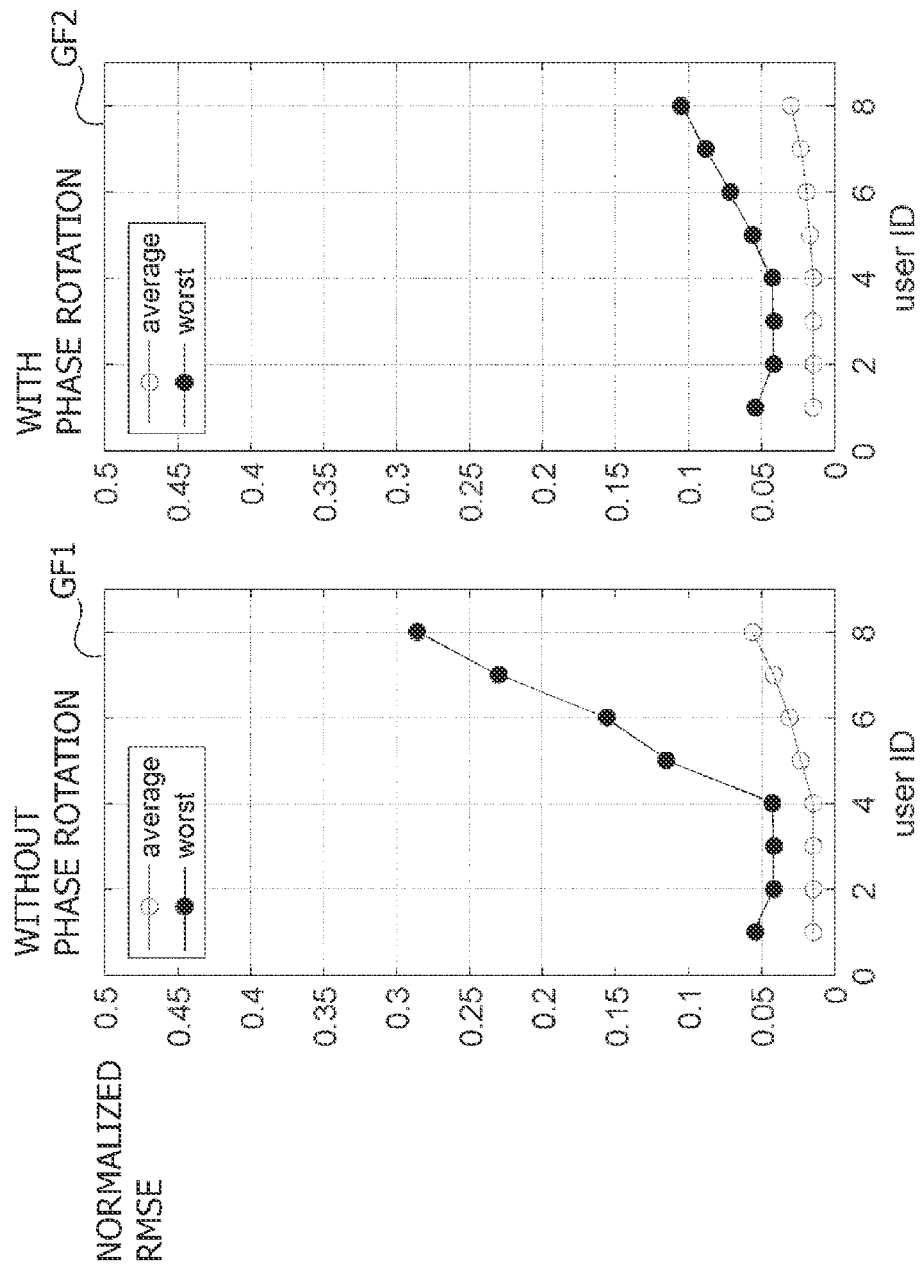
FIG. 17 is a diagram illustrating examples of results of simulations.

FIG. 17 is a diagram illustrating examples of results of simulations. In FIG. 17, a graph GF1 indicating simulation results in a case where there is no phase rotation for transmitted reference signals and received reference signals, and a graph GF2 indicating simulation results in a case where there is phase rotation are illustrated. The simulation results in FIG. 17 are results of simulations of, with the number of terminals K=8 and the number of times of performing transmission in repetition N=8 as simulation conditions, separating a received data signal from each terminal, from data signals transmitted from the terminals by repetition and received by the receiving antenna and restoring the received data signal. In the simulations in the case where phase rotation is performed for transmitted reference signals and received reference signals, the terminals are divided into two groups according to whether received signal power is large or small. Further, transmission power values, and parameters for jitter and the like are set to the same values in both cases.

In the graphs GF1 and GF2, the horizontal axis represents the terminals 2, and the vertical axis represents estimated errors. An estimated error is an error between data transmitted by each terminal and data restored from a received data signal and is determined by root-mean-squared error (RMSE). The terminals 2 are given numbers in descending order of magnitudes of received signal power. That is, in the graphs GF1 and GF2, the received signal power of a terminal #1 is the largest, and the received signal power of a terminal #8 is the smallest. In the graphs GF1 and GF2, estimated error average values (hollow circles) and the worst estimated errors (solid circles) are illustrated for a plurality of simulations of repetition of data signals.

For example, when attention is paid to the terminal #8 with the smallest received signal power, the worst estimated error becomes smaller in GF2 than in GF1, and it is seen that, as described in the first embodiment, an error is improved by giving phase rotation to transmitted reference signals and received reference signals. Further, the estimated error average value is also lower in the graph GF2 than in the graph GF1 for all of the terminals, and it is seen that, as described in the first embodiment, an error is improved by giving phase rotation to transmitted reference signals and received reference signals. It is indicated that, the smaller the error is, the better the communication quality is.

<Operation and Effects of First Embodiment>

According to the first embodiment, when the plurality of terminals 2 sharing the same frequency band and the same time domain perform repetition, the base station 1 can suppress influence of interference among signals from the terminals on a received reference signal. Thereby, the base station 1 can accurately estimate a communication channel with each terminal 2, and radio communication quality is improved.

OTHER EMBODIMENTS

The embodiments described above are examples, and the present disclosure may be changed and carried out as appropriate without departing from the gist of the present disclosure.

The processes and means described in the present disclosure may be freely combined to the extent that no technical conflict exists.

A process which is described to be performed by one device may be performed among a plurality of devices. Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus comprising a controller configured to, when signals are simultaneously received from K transmission-side apparatuses (K: a positive integer) by a receiving antenna, and repetition of repeatedly and successively transmitting the same signal N times (N: a positive integer) is performed by the K transmission-side apparatuses:

acquire a received reference signal r(n) (n=1, . . . , N) that is received by the receiving antenna by the n-th reference signal transmission in the repetition, the received reference signal r(n) including a transmitted reference signal x(k,n) (k=1, . . . , K) from each of the K transmission-side apparatuses, the transmitted reference signal x(k,n) given a phase rotation amount φ(g,n) that is assigned to a group g (g=1, . . . , G) to which the transmission-side apparatus k belongs among G groups (G: a positive integer; 1<G≤K) made by dividing the K transmission-side apparatuses;

acquires, by giving a phase rotation amount opposite to the phase rotation amount φ(g,n) for the group g to the received reference signal r(n) and adding the first to N-th received reference signals in the repetition, a received reference signal r(g) (g=1, . . . , G) of the group g that includes received reference signals from one or more transmission-side apparatuses belonging to the group g; and performs communication channel estimation based on the received reference signal r(g) (g=1, . . . , G).

2. The information processing apparatus according to claim 1, wherein the phase rotation amount φ(g,n) is a value such that received reference signals from transmission-side apparatuses not belonging to the group g are cancelled when giving the phase rotation amount opposite to the phase rotation amount φ(g,n) to the received reference signal r(n) and adding the first to N-th received reference signals in the repetition.

3. The information processing apparatus according to claim 2, wherein the phase rotation amount φ(g,n) is a value such that a phase sequence $\Phi g1$ and a phase sequence $\Phi g2$ are orthogonal to each other in all of combinations of two groups g1 and g2 (g1=1, . . . , G; g2=1, . . . , G; g1≠g2) among the G groups.

4. The information processing apparatus according to claim 1, wherein the controller acquires a data signal d by adding data signals d(n) corresponding to the N times in the repetition, each of the data signals d(n) transmitted from the K transmission-side apparatuses by the n-th data signal transmission in the repetition, received by the receiving antenna, and including a data signal d(k,n) from the transmission-side apparatus k (k=1, . . . , K); and separates a data signal d(k) received from the transmission-side apparatus k, from the data signal d using a result of the communication channel estimation.

5. The information processing apparatus according to claim 1, wherein the controller simultaneously receives signals from the K transmission-side apparatuses by M receiving antennas (M: a positive integer), and, when each of the K transmission-side apparatuses performs the repetition, executes the communication channel estimation for each receiving antenna.

6. A method executed by a computer comprising:
when signals are simultaneously received from K transmission-side apparatuses (K: a positive integer) by a receiving antenna, and repetition of repeatedly and successively transmitting the same signal N times (N: a positive integer) is performed by the K transmission-side apparatuses,
acquiring a received reference signal $r(n)$ ($n=1, \ldots, N$) that is received by the receiving antenna by the n-th reference signal transmission in the repetition, the received reference signal $r(n)$ including a transmitted reference signal $x(k,n)$ ($k=1, \ldots, K$) from each of the K transmission-side apparatuses, the transmitted reference signal $x(k,n)$ given a phase rotation amount $\varphi(g,n)$ that is assigned to a group g ($g=1, \ldots, G$) to which the transmission-side apparatus k belongs among G groups (G: a positive integer; $1 < G \leq K$) made by dividing the K transmission-side apparatuses;
acquiring a phase rotation amount opposite to the phase rotation amount $\varphi(g,n)$ for the group g to the received reference signal $r(n)$ and adding the first to N-th received reference signals in the repetition, a received reference signal $r(g)$ ($g=1, \ldots, G$) of the group g that includes received reference signals from one or more transmission-side apparatuses belonging to the group g; and
performing communication channel estimation based on the received reference signal $r(g)$ ($g=1, \ldots, G$).

7. The method according to claim 6, wherein the phase rotation amount $\varphi(g,n)$ is a value such that received reference signals from transmission-side apparatuses not belonging to the group g are cancelled when giving the phase rotation amount opposite to the phase rotation amount $\varphi(g,n)$ to the received reference signal $r(n)$ and adding the first to N-th received reference signals in the repetition.

8. The method according to claim 7, wherein the phase rotation amount $\varphi(g,n)$ is a value such that a phase sequence $\Phi g1$ and a phase sequence $\Phi g2$ are orthogonal to each other in all of combinations of two groups g1 and g2 ($g1=1, \ldots, G$; $g2=1, \ldots, G$; $g1 \neq g2$) among the G groups.

9. The method according to claim 6, further comprising:
acquiring a data signal d by adding data signals $d(n)$ corresponding to the N times in the repetition, each of the data signals $d(n)$ transmitted from the K transmission-side apparatuses by the n-th data signal transmission in the repetition, received by the receiving antenna, and including a data signal $d(k,n)$ from the transmission-side apparatus k ($k=1, \ldots, K$), and
separating a data signal $d(k)$ received from the transmission-side apparatus k, from the data signal d using a result of the communication channel estimation.

10. The method according to claim 6, wherein the computer simultaneously receives signals from the K transmission-side apparatuses by M receiving antennas (M: a positive integer), and, when each of the K transmission-side apparatuses performs the repetition, executes the communication channel estimation for each receiving antenna.

* * * * *

UNITED STATES PATENT AND TRADEMARK OFFICE
CERTIFICATE OF CORRECTION

Page 1 of 1

PATENT NO. : 12,224,791 B2
APPLICATION NO. : 18/471707
DATED : February 11, 2025
INVENTOR(S) : Kenichi Takizawa et al.

It is certified that error appears in the above-identified patent and that said Letters Patent is hereby corrected as shown below:

In the Claims

Column 26, Line 10 Claim 8 should be corrected to read as follows:
The method according to claim 7, wherein the phase rotation amount $\phi(g,n)$ is a value such that a phase sequence $\Phi g1$ and a phase sequence $\Phi g2$ are orthogonal to each other in all of combinations of two groups g1 and g2 (g1=1, ..., G; g2=1, ..., G; g1≠g2) among the G groups.

Signed and Sealed this
Sixteenth Day of September, 2025

Coke Morgan Stewart
*Acting Director of the United States Patent and Trademark Office*